(12) United States Patent  (10) Patent No.: US 6,629,903 B1
Kondo  (45) Date of Patent: Oct. 7, 2003

(54) BICYCLE DERAILLEUR

(75) Inventor: Masanori Kondo, Wakayama (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/550,712

(22) Filed: Apr. 17, 2000

(51) Int. Cl.⁷ ............................................ F16H 63/00
(52) U.S. Cl. ......................................... 474/82; 474/80
(58) Field of Search ............................ 474/78, 79, 80, 474/81, 82

(56) References Cited

U.S. PATENT DOCUMENTS

| | | | | |
|---|---|---|---|---|
| 4,530,677 A | * | 7/1985 | Nagano | 474/80 |
| 5,358,451 A | | 10/1994 | Lacombe et al. | 474/78 |
| 5,620,384 A | | 4/1997 | Kojima et al. | 474/82 |
| 5,816,966 A | * | 10/1998 | Yang et al. | 474/82 |
| 6,443,032 B1 | * | 9/2002 | Fujii et al. | 74/567 |

FOREIGN PATENT DOCUMENTS

DE  19703933  8/1998

* cited by examiner

Primary Examiner—Thomas R. Hannon
Assistant Examiner—Vicky A. Johnson
(74) Attorney, Agent, or Firm—Shinjyu Global IP Counselors, LLP

(57) ABSTRACT

A derailleur for a bicycle is provided that is easy to operate. The derailleur basically has a mounting member, a chain guide and a chain guide positioning mechanism. The mounting member is adapted to be coupled to a portion of the bicycle. The chain guide is movably coupled to the mounting member. The chain guide is adapted to shift a chain of a bicycle in a transverse direction. The chain guide positioning mechanism has an actuating cam operatively coupled to the chain guide. The actuating cam is adapted to be coupled to a control element such as a cable. The actuating cam is arranged to rotate only in one direction in response to movement of the control element to move the chain guide from a first position to a second position. In the preferred embodiment, the chain guide positioning mechanism includes one-way clutch coupled to the actuating cam, and an indexing mechanism with an indexing element that is arranged to operatively apply a retaining force to the actuating cam. The one-way clutch has a ratchet fixedly coupled to the actuating cam and an actuating element with a pawl engaging the ratchet. The actuating element is adapted to be coupled to the control element such that the control element rotates the actuating element, which in turn engages the ratchet to rotate the actuating cam and moves the chain guide.

21 Claims, 21 Drawing Sheets

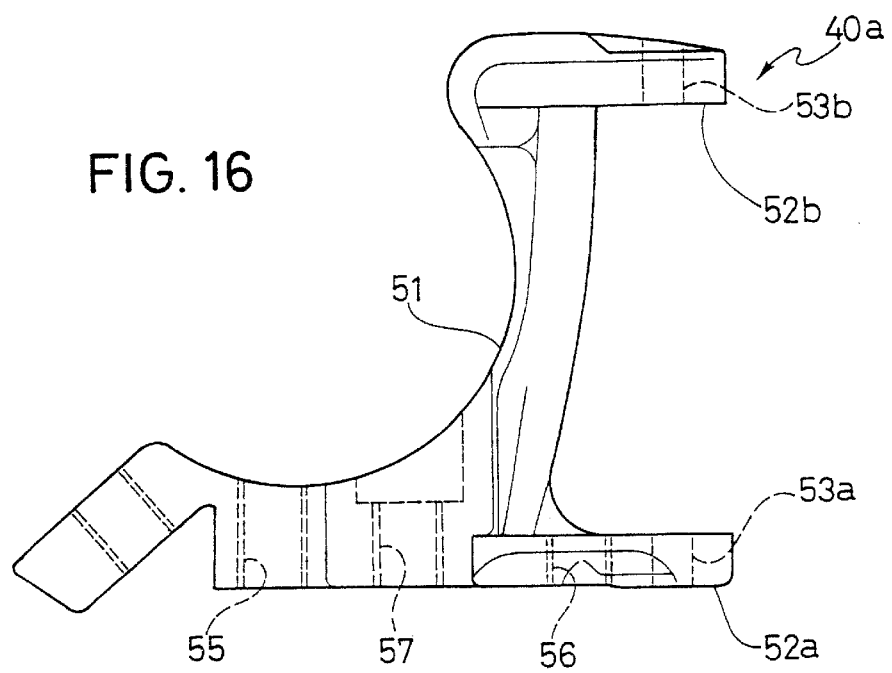
FIG. 16
FIG. 17
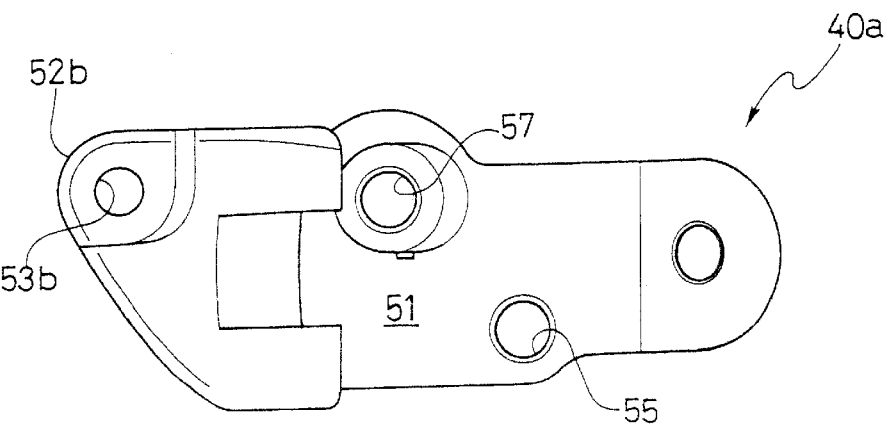
FIG. 18

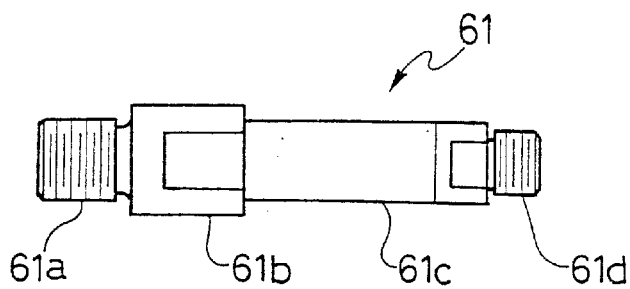
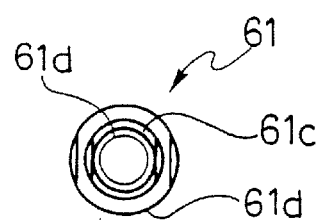
FIG. 19     FIG. 20
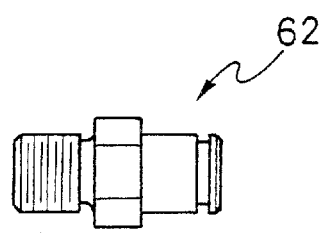
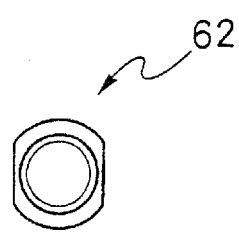
FIG. 21     FIG. 22
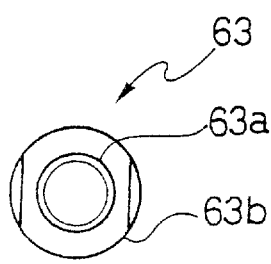
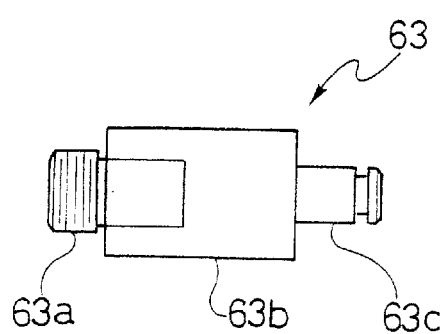
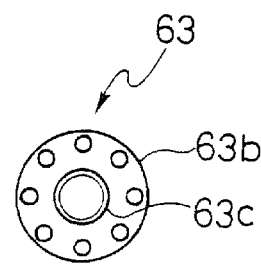
FIG. 23     FIG. 24     FIG. 25

BICYCLE DERAILLEUR

BACKGROUND OF THE INVENTION

1. Field of the Invention

This invention generally relates to a bicycle derailleur. More specifically, the present invention relates to a bicycle derailleur having a gear shifting operation that is easy to operate.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. The various components of the bicycle are usually mounted to the bicycle frame. Some components of the bicycle that have been extensively redesigned are the bicycle derailleurs.

One component that is mounted to the bicycle frame is the front derailleur. Generally speaking, the front derailleur is typically secured to the seat tube of the bicycle frame. Basically, the front derailleur includes a fixed member nonmovably secured to the seat tube of the bicycle frame, and a movable section supported to be movable relative to the fixed member. The movable section supports a chain guide having a pair of vertical surfaces for contacting a chain.

Many prior art derailleurs and their shifting devices suffer from several disadvantages. For example, most mechanical shifting devices for derailleurs require one lever or button to up shift and another lever or button to down shift. Thus, the rider can be confused on which lever or button to use. Moreover, some prior art derailleurs and/or their shifting devices are sometimes complicated and expensive to manufacture. Also the shifting devices for some require a considerable amount of force to operate.

In view of the above, there exists a need for a bicycle derailleur which overcomes the above mentioned problems in the prior art. This invention addresses this need in the prior art as well as other needs, which will become apparent to those skilled in the art from this disclosure.

SUMMARY OF THE INVENTION

One object of this invention is to provide riders with a gear shifting operation that is easy to operate. The shifting of the derailleur, either from a low gear to a high gear or vice versa, requires only to push a shifting lever. This push forces the rotating cam to only rotate in one direction.

Another object is to provide a gear shifting mechanism that is simple and low cost to produce.

Yet another object is to provide a gear shifting operation that is very light to operate.

The foregoing objects can basically be attained by providing a derailleur for a bicycle is provided that is easy to operate. The derailleur basically has a mounting member, a chain guide and a chain guide positioning mechanism. The mounting member is adapted to be coupled to a portion of the bicycle. The chain guide is movably coupled to the mounting member. The chain guide is adapted to shift a chain of a bicycle in a transverse direction. The chain guide positioning mechanism has an actuating cam operatively coupled to the chain guide. The actuating cam is adapted to be coupled to a control element and is arranged to rotate only in one direction in response to movement of the control element to move the chain guide from a first position to a second position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 16 is an enlarged top plan view of a portion of the housing of the front derailleur illustrated in FIGS. 1–15;

FIG. 17 is a front elevational view of the portion of the housing illustrated in FIG. 15;

FIG. 18 is a rear elevational view of the portion of the housing illustrated in FIGS. 16 and 17;

FIG. 19 is an enlarged side elevational view of a main axle of the chain guide positioning mechanism of the front derailleur illustrated in FIGS. 1–15;

FIG. 20 is an end elevational view of the main axle illustrated in FIG. 19;

FIG. 21 is an enlarged side elevational view of an inner link axle of the front derailleur illustrated in FIGS. 1–15;

FIG. 22 is an end elevational view of the inner link axle illustrated in FIG. 21;

FIG. 23 is an enlarged left side elevational view of an indexing axle of the front derailleur illustrated in FIGS. 1–15;

FIG. 24 is a front elevational view of the indexing axle illustrated in FIG. 23;

FIG. 25 is a right side elevational view of the indexing axle illustrated in FIGS. 23 and 24;

DETAILED DESCRIPTION OF THE PREFERRED EMBODIMENTS

Figure 1:
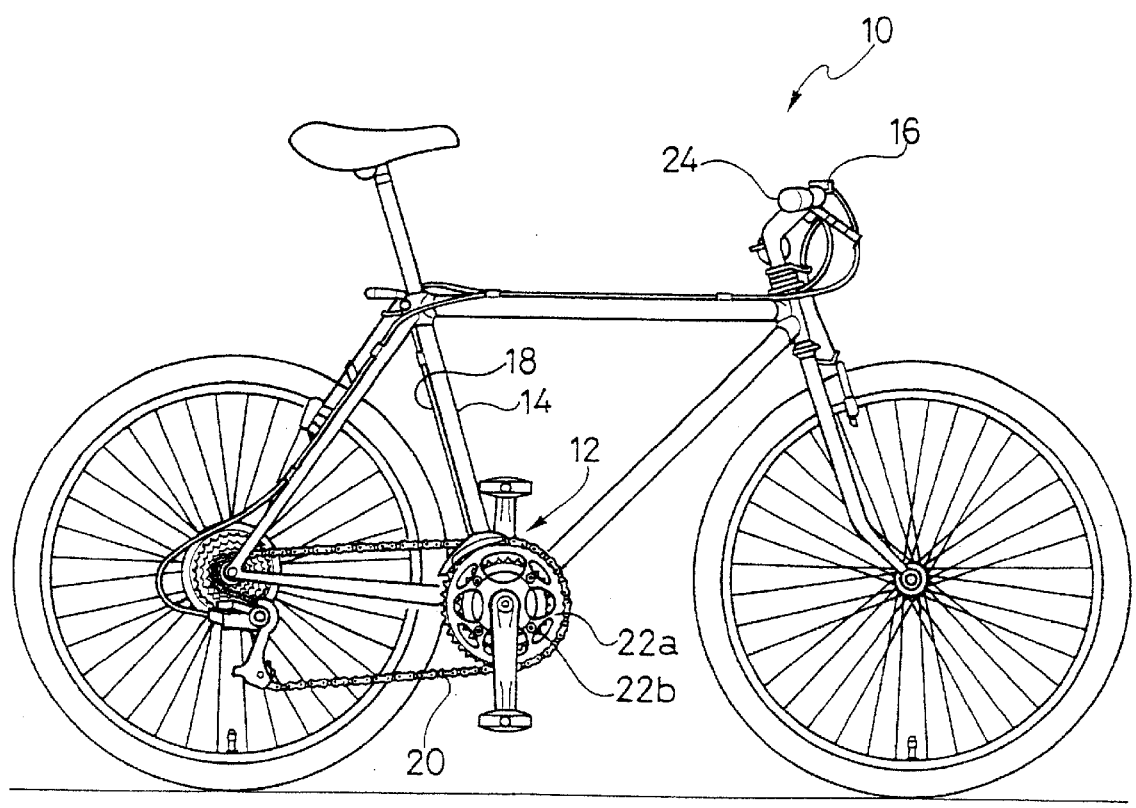
FIG. 1 is a side elevational view of a bicycle with a front derailleur in accordance with the present invention.
Figure 2:
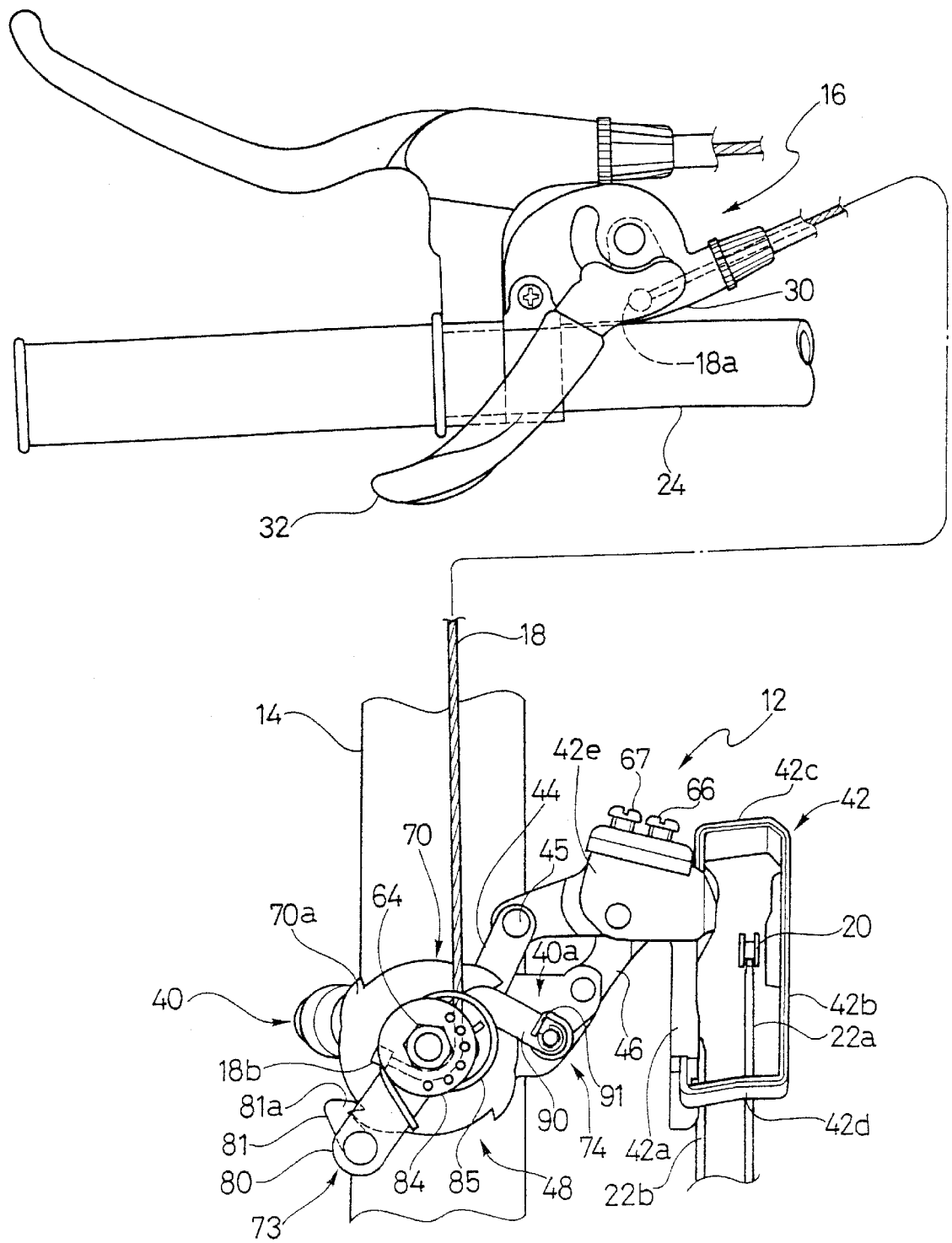
FIG. 2 is a diagrammatic view of the front derailleur with a chain guide positioning mechanism coupled to a shifting unit in accordance with the present invention.

Referring initially to FIG. 1, a bicycle 10 is illustrated with a front derailleur 12 fixedly coupled to its seat tube 14 of its frame. As seen in FIG. 2, the front derailleur 12 is operated by a shifting unit 16 via a shift cable or control element 18 to move chain 20 between two front sprockets 22a and 22b of the drive train. The shifting unit 16 is mounted on the handlebar 24 as seen in FIG. 2

Bicycles and their various components are well known in the art, and thus, bicycle 10 and its various components will not be discussed or illustrated in detail herein except for the components that relate to the present invention. In other words, only front derailleur 12 and the components that relate thereto will be discussed and/or illustrated herein. As used herein, the terms "forward, rearward, upward, above, downward, below and transverse" refer to those directions of a bicycle in its normal riding position, to which front derailleur 12 is attached. Accordingly, these terms, as utilized to describe the front derailleur 12 in the claims, should be interpreted relative to bicycle 10 in its normal riding position.

The front derailleur is operated by movement of the shifting unit 16. Preferably, the shifting unit 16 is mounted on the handlebar 24 of the bicycle 10, and includes a mounting portion 30 with a shift lever 32 pivotally coupled thereto. The shift lever 32 is attached to a first end or nipple 18a of the cable (control element) 18 in a conventional manner. The second end or nipple 18b of the shift cable 18 is operatively coupled to the front derailleur 12, as discussed below. When the shift lever 32 is pivoted, this causes the shift cable 18 to be pulled relative to the front derailleur 12. When the shift lever 32 is released, a return spring (not shown) urges the shift lever 32 and the shift cable 18 back to its original position. Thus, the shift cable 18 is pushed relative to the front derailleur 12 when the shift lever 32 is released.

The precise configuration of the shifting unit 16 is not important to the present invention. The shifting unit should be able to pull and release the shift cable or control element 18 a predetermined amount. It will be apparent to those skilled in the art from this disclosure that a conventional brake lever assembly could be utilized to operate the front derailleur 12 in accordance with the present invention. Moreover, a push button can be used instead of a lever with the illustrated embodiment. In addition, it will be apparent to those skilled in the art from this disclosure that other types of mechanisms can be used.

Front derailleur 12 basically includes fixed or mounting member 40, a chain guide 42 movably coupled to the mounting member 40 by a pair of links 44 and 46, and a chain guide positioning mechanism 48 that controls the movement of the chain guide 42 relative to the mounting member 40. More specifically, the chain guide positioning mechanism 48 is coupled to the second end 18b of the shift cable 18 to move the chain guide 42 between a first position and a second position. In the first position, the chain guide 42 guides chain 20 over the outer or larger sprocket 22a. In the second position, the chain guide 42 guides chain 20 over the inner sprocket or smaller sprocket 22b. The chain guide 42 is moved between the first position and the second position when the shift lever 32 is squeezed and then released. Accordingly, a very simple shifting unit 16 can be used to operate front derailleur 12.

As best seen in FIGS. 1–15, the mounting or fixed member 40 is preferably clamped directly to the seat post portion or tube 14 of the bicycle frame. While front derailleur 12 is illustrated as being fixedly coupled to seat post portion 14 of the bicycle frame, it will be apparent to those skilled in the art from this disclosure that front derailleur 12 can be coupled to other parts of the bicycle 10 such as the bottom bracket as needed and/or desired. Moreover, derailleur 12 could be coupled to bicycle 10 at a mounting portion brazed or welded to the frame of bicycle 10.

Additionally, in the preferred embodiment the chain guide 42 is arranged above the mounting member 40, and the control element or cable 18 extends down along seat tube 14. Of course it will be apparent to those skilled in the art from this disclosure that chain guide 42 could be arranged below the mounting member 40 if needed and/or desired. Moreover, the control element or cable 18 could extend around the bottom bracket and back up the seat tube 14 to derailleur 12.

Figure 3:
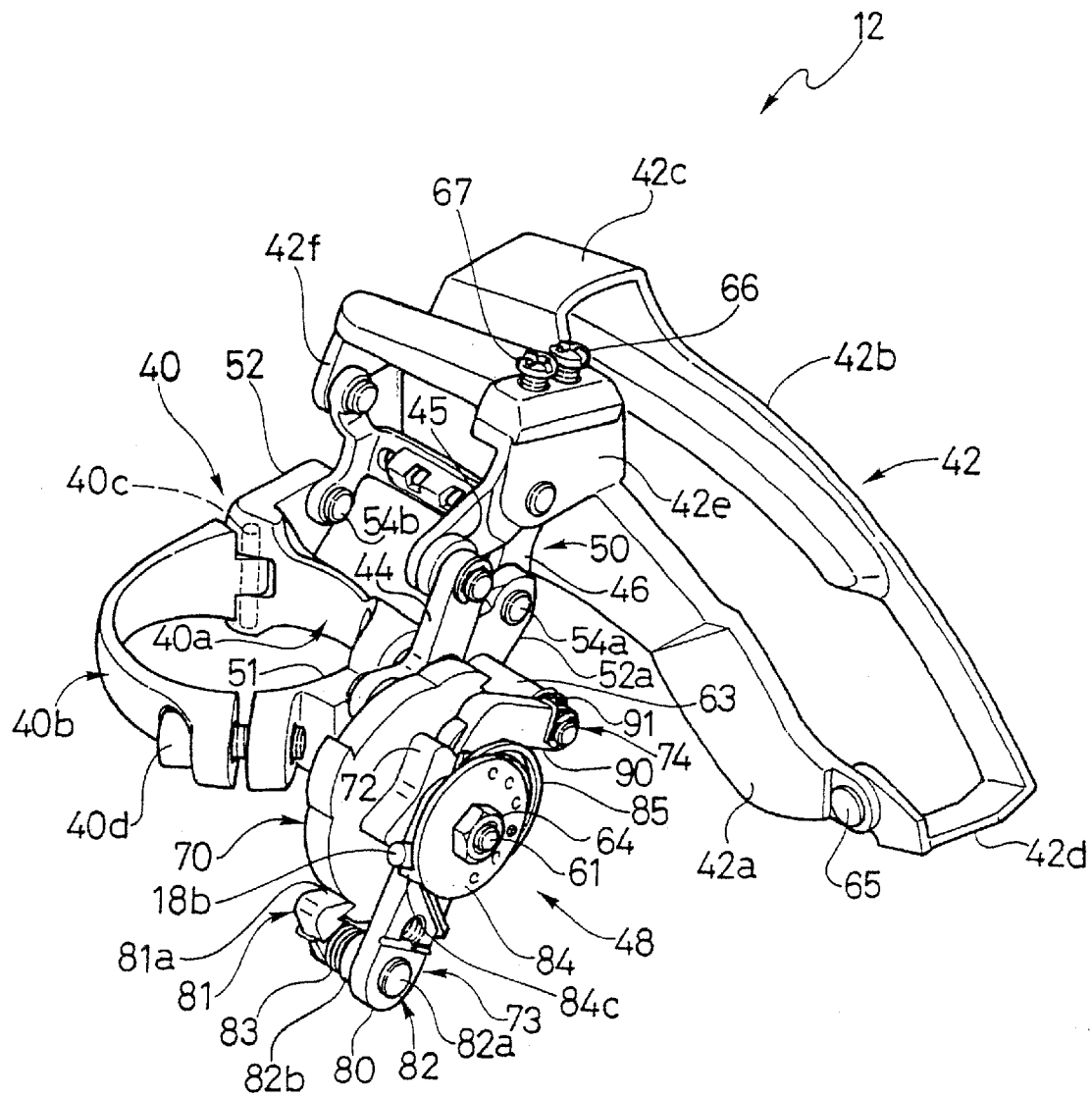
FIG. 3 is a perspective view the front derailleur and chain guide positioning mechanism removed from the bicycle with the front derailleur in a top position.
Figure 4:
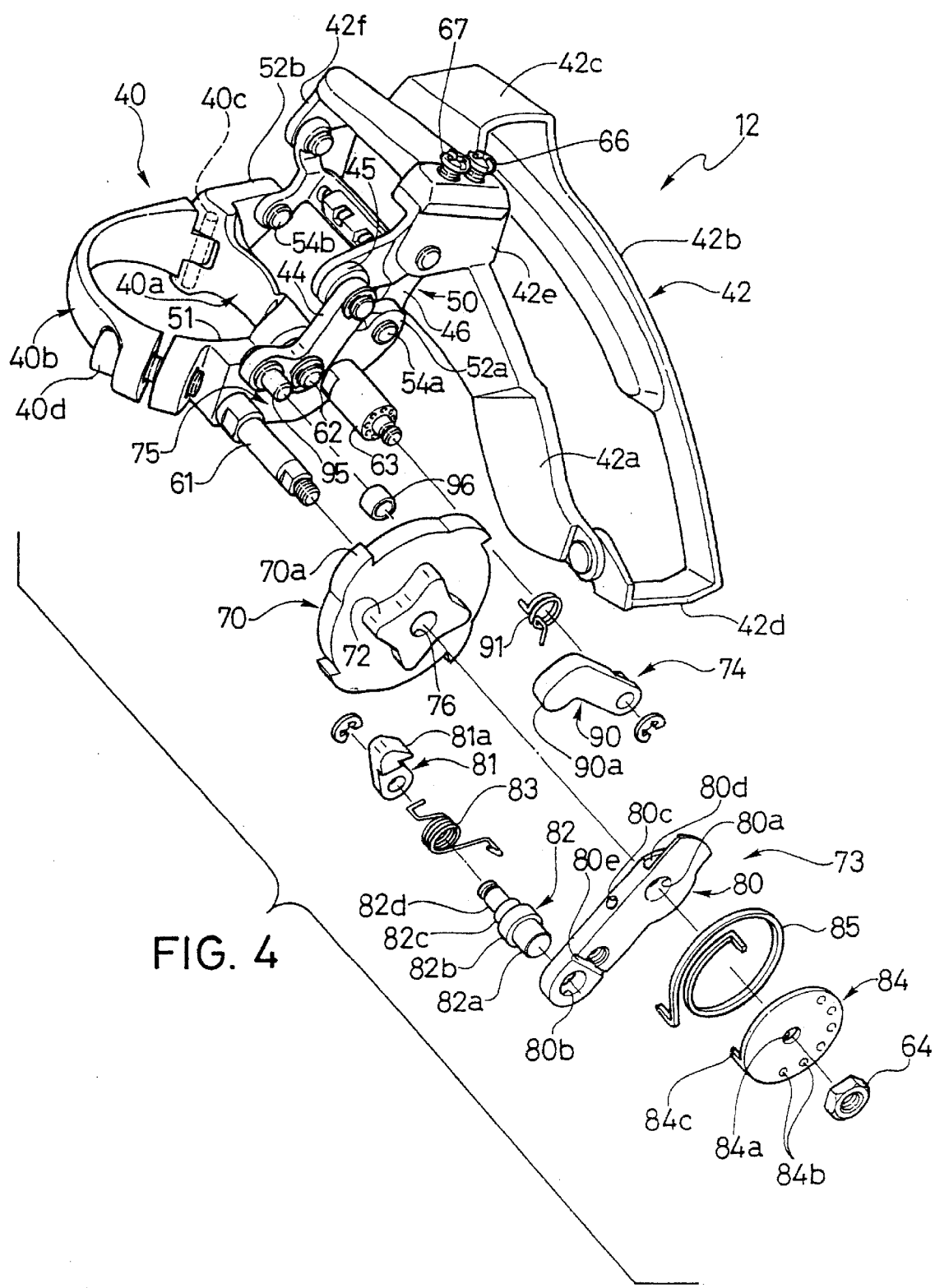
FIG. 4 is a partially exploded perspective view of the front derailleur and chain guide positioning mechanism illustrated in FIG. 3.
Figure 5:
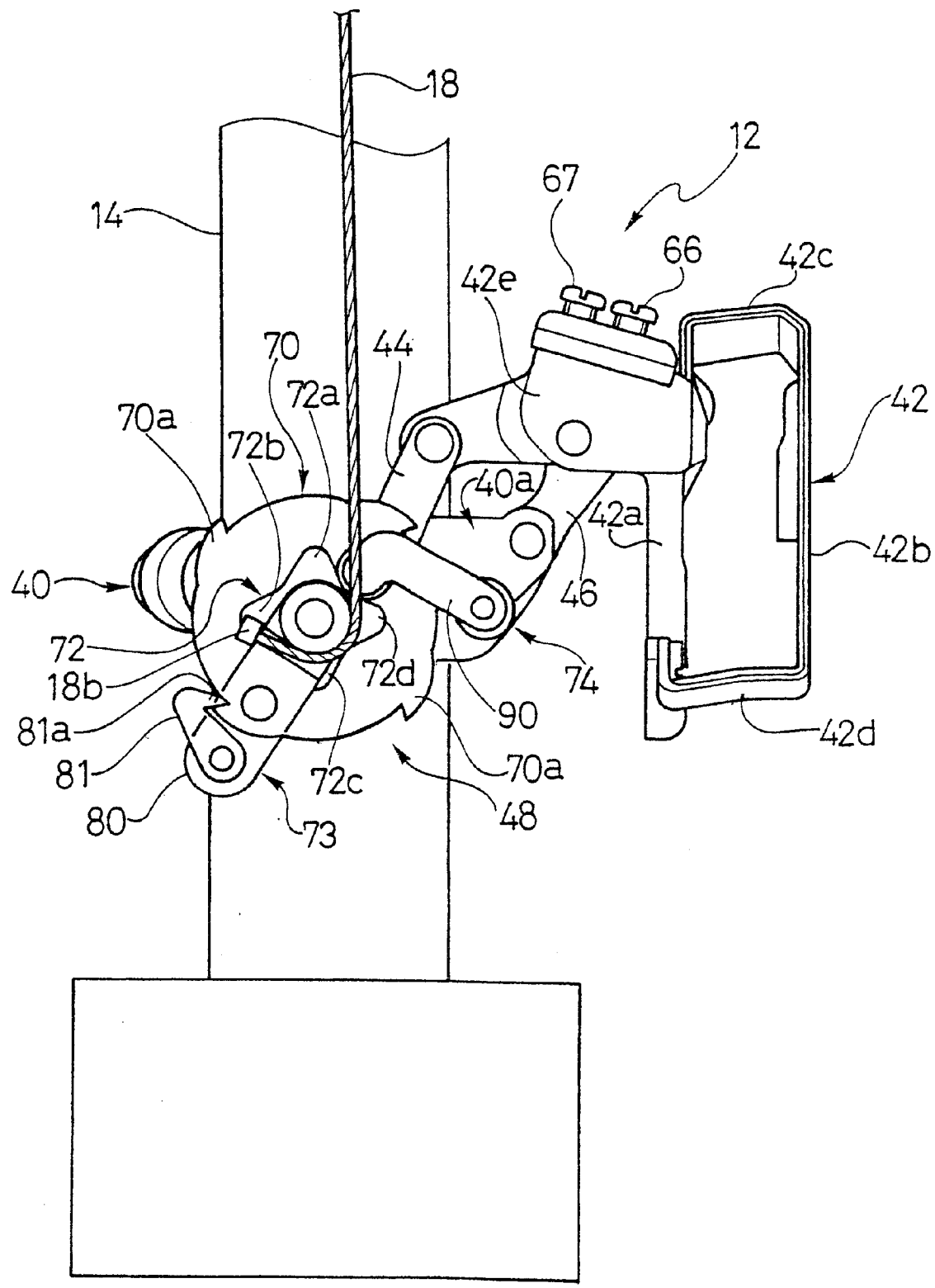
FIG. 5 is a partial, schematic elevational view of the front derailleur illustrated in FIGS. 1–4 with the derailleur in the top position and an actuating member of the chain guide positioning mechanism in the returned or rest position.

The mounting member 40 basically includes a first C-shaped clamping portion 40a, a second C-shaped clamping portion 40b, a pivot pin 40c and a fastener 40d as best seen in FIGS. 3 and 4. The first and second clamping portions 40a and 40b are constructed of a rigid material to fixedly and rigidly secure the front derailleur 12 to the seat post portion 16 of the bicycle 10. Preferably, the clamping portions 40a and 40b are constructed of a hard metallic material. Of course, the clamping portions 40a and 40b could be constructed of other rigid materials, such as a hard rigid plastic material. In the illustrated embodiment, the clamping portions 40a and 40b are constructed by utilizing conventional manufacturing techniques, such as casting and/or machining. Of course, the clamping portions 40a and 40b can also be constructed of sheet metal that is bent into the desired shape.

The first ends of the clamping portions 40a and 40b are pivotally coupled together by the pivot pin 40c, which extends in a substantially vertical direction relative to the bicycle 10. The other ends of the clamping portions 40a and 40b are releasably connected together by the fastener 40d. The fastener 40d is preferably a screw or fixing bolt that is threaded into a threaded hole of the second end of the first clamping portion 40a. Of course, the fastener 40d can be utilized in conjunction with a nut or the like.

As best seen in FIGS. 3, 4 and 16–18, the first clamping portion 40a forms a portion of a linkage assembly 50 that couples the mounting member 40 to the chain guide 42. In other words, portions of the linkage assembly 50 are integrally formed with the first clamping portion 40a as explained below.

The first clamping portion 40a has a curved portion 51, a pair of substantially parallel mounting flanges 52a and 52b that extend outwardly from the curved portion 51. Each of the mounting flanges 52a and 52b has a pivot hole 53a or 53b that receives a pivot pin 54a or 54b for coupling the second or outer link 46 thereto. The pivot holes 53a and 53b are axially aligned so that the second or outer link 46 pivots smoothly relative to the mounting member 40.

The first clamping portion 40a also has three additional threaded holes 55, 56 and 57 for fixedly securing three pivot axles 61, 62 and 63 for mounting the first or inner link 44 and the chain guide positioning mechanism 48 thereto, as explained below. The first threaded hole 55 fixedly receives a first or main pivot axle 61, which supports a part of the chain guide positioning mechanism 48.

The main axle 61 can basically be divided into four somewhat cylindrical sections 61a, 61b, 61c and 61d, as seen in FIGS. 19–20. Each of the end sections 61a and 61d of the main axle 61 is threaded with the first section 61a end being threadedly received in the hole 55 of the mounting member 40. The other or second end section 61d of the main axle 61 is threaded for receiving a nut 64 to hold a portion of the chain guide positioning mechanism 48. The second section 61b of the main axle 61 has the largest diameter and has a pair of flat sections so that the main axle 61 can be easily threaded into the hole 55 of the mounting member 40. This second section 61b forms an abutment surface with the third section 61c such that the chain guide positioning mechanism 48 is spaced from the mounting member 40. In other words, the second section 61b acts as a spacing section. The third section 61c of the main axle 61 has the positioning ratchet and the actuating member freely rotatable thereon. The end of the third section 61c remote from the second section 61b is preferably provided with a pair of flat sections for non-rotatably receiving the fixing plate during the installation procedure of the chain guide positioning mechanism 48. The main pivot axle 61 basically includes a first threaded section 61a, a second cylindrical section 61b with a pair of flat surfaces, a third cylindrical section 61c with a pair of flat surfaces and a fourth section 61d with threads.

The indexing axle 63 basically has three sections 63a, 63b and 63c, as best seen in FIGS. 23–25. The first section 63a of the indexing axle 63 is threaded for being threaded into the mounting hole 56 of the mounting member 40. The second section 63b of the indexing axle 63 has a pair of flat sections for rotating the indexing axle 63. This second section 63b also acts as a spacing element for aligning the indexing arm with the indexing cam. The third section 63c of the indexing axle 63 rotatably supports the indexing arm and has an annular groove for receiving a retaining clip for attaching the indexing arm thereto. The abutment surface formed between the second section 63b and the third section 63c has a plurality of axially extending holes that receive one end of the indexing spring. Preferably, the indexing spring is a torsion spring with one end located in one of the holes of the indexing axle 63, and the other end being bent around the indexing arm.

As best seen in FIGS. 2–15, the chain guide 42 is preferably constructed of a hard rigid material. For example, the chain guide 42 is preferably constructed of a metal material such as a rigid sheet metal that is bent to the desired shape. The chain guide 42 has a chain receiving slot that is formed by a pair of vertical shift plates 42a and 42b. The vertical shift plates 42a and 42b are adapted to engage the chain 20 and thus move the chain 20 in a direction substantially transverse to the bicycle 10. The shift plates 42a and 42b are connected together by a pair of plates 42c and 42d. The upper plate 42c is integrally formed between the shift plates 42a and 42b. The lower plate 42d has one end that is integrally formed with the outer shift plate 42b and the other end that is attached to the inner shift plate 42a via a fastener 65, such as a screw or rivet.

The chain guide 42 also has a pair of mounting flanges 42e and 42f extending outwardly from the inner shift plate 42a for coupling to the mounting member 40 via the inner and outer links 44 and 46. Thus, these mounting flanges 42e and 42f of the chain guide 42 form a portion of the linkage assembly 50 that couples the chain guide 42 to the mounting member 40. The mounting flange 42e is also preferably provided with a pair of threaded holes for receiving adjustment screws 66 and 67 therein. The first adjustment screw 66 is a low position adjustment screw, while the second adjustment screw 67 is a high position adjustment screw. The adjustment screws 66 and 67 engage a fan-shaped portion of the linkage assembly 50 for controlling a range of movement of the chain guide 42. In other words, by individually adjusting the axial extension of the adjustment screws 66 and 67 relative to the chain guide 42, the retracted (low position) and the extended (top position) of the chain guide 42 are independently adjusted relative to one another. This adjustment mechanism is well known in the art, and thus will not be shown or described in detail herein.

Preferably, the linkage assembly 50 is a four-bar linkage that is formed by the first and second links 44 and 46 and portions of the mounting member 40 and the chain guide 42. The first link 44 has a pair of pivot points lying on a line which is substantially parallel to a line that passes through the pivot points of the second link 46. Similarly, the pivot points of each first end of the first and second links 44 and 46 lie on a line which is substantially parallel to a line that passes through the pivot points of the other or second ends of the first and second links 44 and 46.

Figure 26:
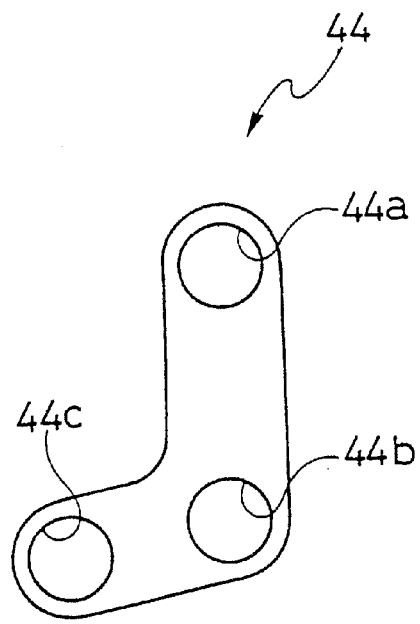
FIG. 26 is an enlarged side elevational view of an inner link of the front derailleur illustrated in FIGS. 1–15.
Figure 27:
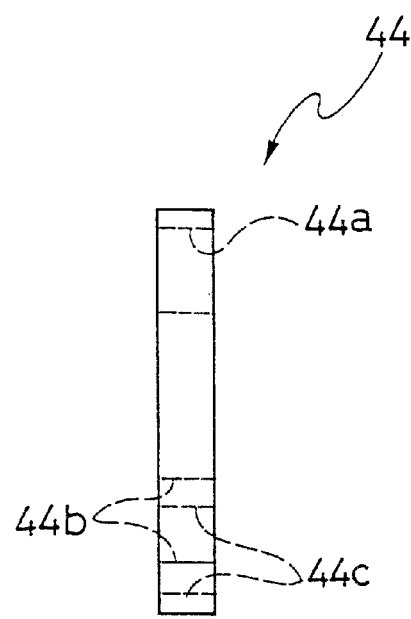
FIG. 27 is an end elevational view of the inner link illustrated in FIG. 26.
Figure 28:
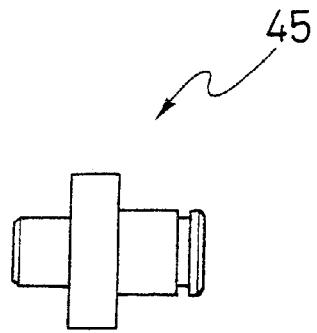
FIG. 28 is an enlarged side elevational view of an inner link rivet of the front derailleur illustrated in FIGS. 1–15.

The first or inner link 44 is operatively coupled to the chain guide positioning mechanism 48 for moving the chain guide 42 between the first and second position. More specifically, the inner link 44 is an L-shaped member that is pivotally mounted on the pivot axle 62 extending outwardly from the first C-shaped clamping portion 40a. The inner link 44 has three mounting holes 44a, 44b and 44c, as best seen in FIGS. 26–27. The first two mounting holes 44a and 44b receive the pivot pins for the linkage assembly 50, while the third mounting hole 44c receives a part of the chain guide positioning mechanism 48. Specifically, hole 44a receives a rivet 45 (FIG. 28), hole 44b is mounted on inner link axle 62 (FIGS. 21–22) and hole 44c receives cam follower 75 (FIG. 29), as explained in more detail below.

The chain guide positioning mechanism 48 basically includes a positioning ratchet 70 with an actuating cam 71 and an indexing cam 72, an actuating mechanism or member 73, an indexing mechanism or member 74 and a cam follower 75. The chain guide positioning mechanism 48 is operatively coupled to the shift cable 18 such that when the rider squeezes the shift lever 32 of the shifting unit 16, this pulls the shift cable 18 to rotate the positioning ratchet 70. This rotation of the positioning ratchet 70 causes the actuating cam 71 to move the chain guide 42 between its first and second positions via the linkage assembly 50. In the preferred embodiment, the chain guide positioning mechanism 48 is coupled to first clamping portion 40a on a first side of the housing 40. Of course it will be apparent to those skilled in the art from this disclosure that chain guide positioning mechanism 48 could be coupled to other portions of housing 40 if needed and/or desired. For example, chain guide positioning mechanism could be coupled to an opposite side or another location relative to housing 40.

Referring now to FIGS. 3, 4 and 30–33, the positioning ratchet 70 is a disk-shaped member that is rotatably mounted on the main axle 61 so as to freely rotate there-around. As explained below, the positioning ratchet 70 is integrally formed with the actuating cam 71 and the indexing cam 72 so that they rotate together on the main axle 61 via center hole 76. The rotational direction of the positioning ratchet 70, the actuating cam 71 and the indexing cam 72 are controlled by the actuating member 73 and the indexing member 74, as explained below.

The positioning ratchet 70 preferably includes four ratchet teeth 70a that are spaced 90° apart on the outer periphery of the positioning ratchet 70. Each of these teeth 70a has an abutment surface 70b and a ramping surface 70c that engages the actuating member 73 to control the rotational movement of the positioning ratchet 70. Accordingly, the positioning ratchet 70 cooperates with the actuating member 73 and the indexing mechanism or member 74 to ensure that the actuating cam 71 and the indexing cam 72 rotate only in one direction.

The actuating cam 71 is integrally formed on an axial face of the positioning ratchet 70 that is opposite the indexing cam 72. The actuating cam 71 is surrounded by an actuating groove 78 with a similar shape. More specifically, the actuating cam 71 is an oval or oblong-shaped cam member that has four flat positioning surfaces 71a, 71b, 71c and 71d. Two of the positioning surfaces 71a and 71c of the actuating cam 71 correspond to first or top positions, while the other two positioning surfaces 71b and 71d of the actuating cam 71 correspond to low or second positions. In other words, one complete rotation of the actuating cam 71 causes the chain guide 42 to reciprocate two times between the top and low positions. Preferably, the four positioning surfaces 71a–71d of the actuating cam 71 are flat surfaces that assist in the positioning of the chain guide 42.

The actuating groove 78 that surrounds the actuating cam 71 has an oval inner surface 78a that corresponds to the outer peripheral surface of the actuating cam 71, and an oval outer surface 78b spaced from inner surface 78a. In other words, the actuating groove 78 is provided with four flat positioning surfaces 79a, 79b, 79c and 79d formed in outer surface 78b that correspond to the flat positioning surfaces 71a, 71b, 71c and 71d of the actuating cam 71.

The indexing cam 72 is located on the axial face of the positioning ratchet 70 that is opposite the actuating cam 71. The indexing cam 72 cooperates with indexing mechanism 74 to hold the actuating cam 71 and the positioning ratchet 70 in one of the four rotational positions. Preferably, the indexing cam 72 is a star-shaped member having four camming protrusions 72a, 72b, 72c and 72d and four recesses 72e, 72f, 72g and 72h alternating with the camming protrusions 72a, 72b, 72c and 72d. Two of the camming protrusions 72a and 72c are aligned with the top positioning surfaces 71a and 71c of the actuating cam 71, while the other two camming protrusions 72b and 72d are aligned with the low flat positioning surfaces 71b and 71d of the actuating cam 71. The camming protrusions 72a, 72b, 72c and 72d are preferably spaced 90° apart.

Referring now to FIGS. 3, 4 and 34–40, the actuating member or mechanism 73 basically includes an actuating arm or element 80, a pawl 81, a pawl axle 82, a pawl return spring 83, a return spring fixing plate 84 and an actuating return spring 85. The actuating arm 80 has a first hole 80a at one end that receives the main axle 61 therethrough, and a hole 80b at its other end for mounting the pawl 81 thereto via the pawl axle 82. The first hole 80a is sized and shaped to allow the actuating arm 80 to rotate freely about the main axle 61. The second hole 80b has the pawl axle 82 fixedly coupled therein. Preferably, the end of pawl axis 82 is deformed so as to be riveted to actuating arm 80. The actuating arm 80 is also provided with a through bore 80c located between the first and second holes 80a and 80b for receiving the shift cable 18 therein. Preferably, a curved groove 80d is formed from the through bore 80c around the first hole 80a for receiving the shift cable 18 as the actuating arm 80 is rotated. A surface groove 80e is also formed on the actuating arm 80 for receiving one end of the pawl spring 83.

The pawl 81 is rotatably mounted on the pawl axle 82, and includes an abutment or tooth 81a at the end that is remote from the hole 80b that receives the pawl axle 82. The pawl return spring 83 has its coiled portion located around the pawl axle 82 between the pawl 81 and the actuating arm 80. One end of the pawl return spring 83 engages the pawl 81, while the other end of the pawl return spring 83 engages the actuating arm 80 to bias the pawl 81 against the peripheral surface of the positioning ratchet 70. Specifically, the other end of the pawl spring is engaged in the surface groove 80e of the actuating arm 80. Accordingly, the pawl 81 engages the teeth 70a of the positioning ratchet 70 to rotate the positioning ratchet 70 when the actuating arm 80 is rotated in a counterclockwise direction, as seen in FIGS. 3–15. However, when the actuating arm 80 is rotated in a clockwise direction, the pawl 81 engages the ramping surfaces 70c of the teeth 70a so that the actuating arm 80 can rotate relative to the positioning ratchet 70. In other words, rotation of the actuating arm 80 in the clockwise direction does not cause the actuating cam 71 or the indexing cam 72 to move. The actuating arm 80 is rotated in the counterclockwise direction when the shift lever 32 is squeezed to cause the shift cable 18 to pull the actuating arm 80. The actuating arm 80 is rotated in the clockwise direction when the shift lever 32 is released to slacken the shift cable 18. The rotation in the clockwise direction of the actuating arm 80 is produced by the force of the actuating return spring 85. The rotation of the actuating arm 80 in the clockwise direction will stop when the shift cable 18 becomes taut. Alternatively, rotation of the actuating arm 80 in the clockwise direction will stop when the actuating arm hits a stopper 84c that extends from the return spring fixing plate 84.

The pawl axle 82 is a step-shaped shaft having a first end 82a that is received in the actuating arm 80, a center spacing section 82b with the largest diameter, a spring support section 82c, and a pawl supporting section 82d. The pawl supporting section 82d has an annular groove for receiving a C clip to retain the pawl thereon. First end 82a of pawl axle 82 is preferably deformed to be riveted to actuating arm 80. Alternatively, first end 82a of pawl axle 82 could be threadedly coupled to actuating arm 80. Accordingly, the pawl is mounted for rotation on the pawl supporting section 82d section.

Figure 38:
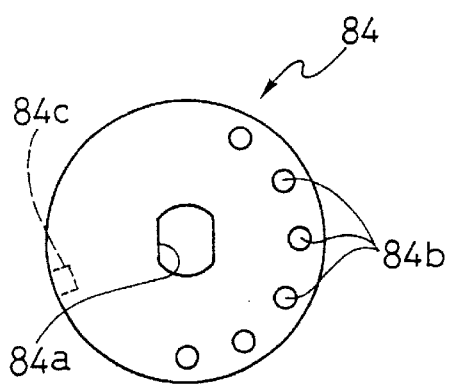
FIG. 38 is an enlarged side elevational view of a fixing plate of the chain guide positioning mechanism of the front derailleur illustrated in FIGS. 1–15.
Figure 39:
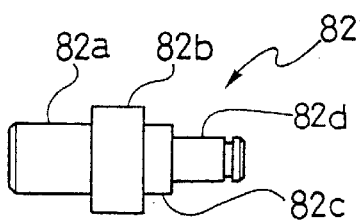
FIG. 39 is an enlarged side elevational view of a pawl axle of the chain guide positioning mechanism of the front derailleur illustrated in FIGS. 1–15.
Figure 40:
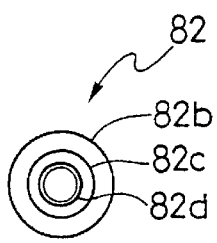
FIG. 40 is an end elevational view of the pawl axle illustrated in FIG. 39.
Figure 41:
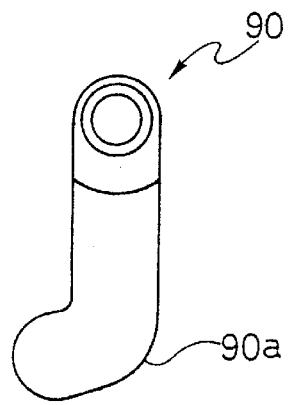
FIG. 41 is an enlarged side elevational view of an indexing arm of the chain guide positioning mechanism of the front derailleur illustrated in FIGS. 1–15.
Figure 42:
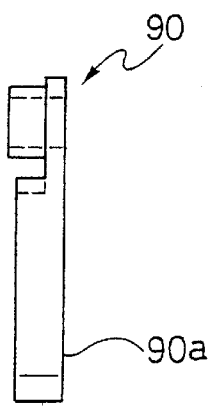
FIG. 42 is an end elevational view of the indexing arm illustrated in FIG. 41.
Figure 43:
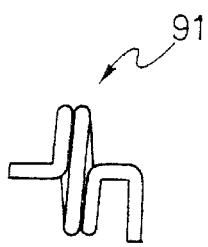
FIG. 43 is an enlarged side elevational view of an indexing spring of the chain guide positioning mechanism of the front derailleur illustrated in FIGS. 1–15.
Figure 44:
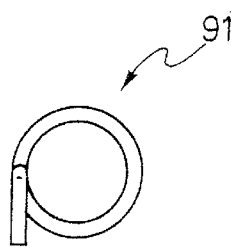
FIG. 44 is an end elevational view of the indexing spring illustrated in FIG. 43.

Turning now to FIGS. 4 and 38, the fixing plate 84 has a non-circular center hole 84a that receives a portion of the main axle 61 so that the fixing plate 84 does not rotate relative to the main axle 61. The fixing plate 84 also has a plurality of spring adjustment holes 84b that are located in an arc-shaped pattern about the center of the fixing plate 84. These holes 84b receive one end of the actuating return spring 85, while the other end of the actuating return spring 85 engages a portion of the actuating arm 80. Preferably, the actuating return spring 85 is a torsion spring. The fixing plate 84 is preferably provided with a stopper 84c to limit the clockwise rotation of actuating arm 80. Alternatively, stopper 84c can be eliminated if needed and/or desired. In such an arrangement, cable 18 and actuating member return spring 85 should be configured to provide the function of a rotational stop for actuating arm 80.

Turning now to FIGS. 3, 4, 23–25 and 41–44 the indexing member or mechanism 74 basically includes an indexing arm or element 90 and an indexing spring 91. The indexing arm 90 is a somewhat L-shaped member with one end being pivotally mounted on the indexing axle 63. The other end of the indexing arm 90 is a free end 90a designed to slide along indexing cam 72. Alternatively, free end 90a can have an indexing roller rotatably mounted thereto if needed and/or desired. The indexing spring 91 is mounted on the indexing axle 63 for biasing the indexing arm 90 against the indexing cam 72 such that the free end 90a of the indexing arm 90 engages the outer peripheral surface of the indexing cam 72. As the indexing cam 72 rotates in a clockwise direction, the camming protrusions 72a–72d of the indexing cam 72 causes the indexing arm 90 to rotate in a clockwise direction around the indexing axle 63 against the force of the indexing spring 91. Preferably, the indexing spring 91 is a torsion spring with one end coupled to the indexing axle 63 and the other end engaging the indexing arm 90. When the free end 90a of the indexing arm 90 is located in one of the recesses 72e–72h between the camming protrusions 72a–72d of the indexing cam 72, rotation of the positioning ratchet 70 and the actuating cam 71 is overridably maintained. In other words, the positioning ratchet 70 and actuating cam 71 will not rotate until pawl 81 and actuating arm 80 rotate in the counter clockwise direction. During such rotation, the force applied from actuating arm 80 is larger than the force of indexing spring 91.

Figure 29:
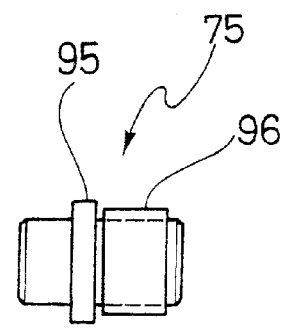
FIG. 29 is an enlarged side elevational view of the cam follower with a roller of the chain guide positioning mechanism of the front derailleur illustrated in FIGS. 1–15.
Figure 30:
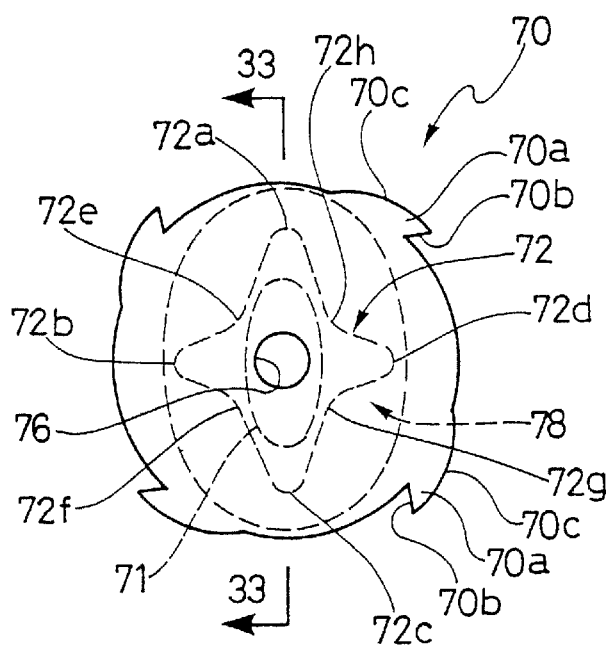
FIG. 30 is an enlarged front elevational view of a positioning ratchet of the chain guide positioning mechanism of the front derailleur illustrated in FIGS. 1–15.
Figure 31:
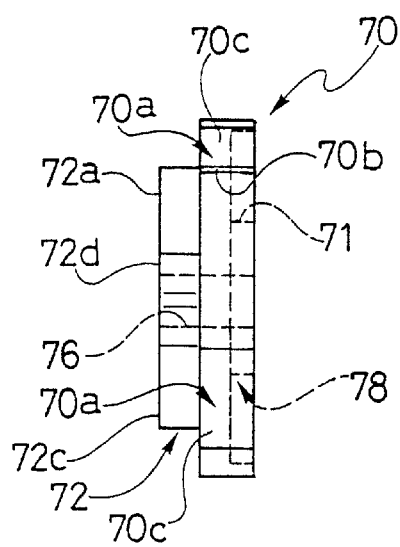
FIG. 31 is an end elevational view of the positioning ratchet illustrated in FIG. 30.
Figure 32:
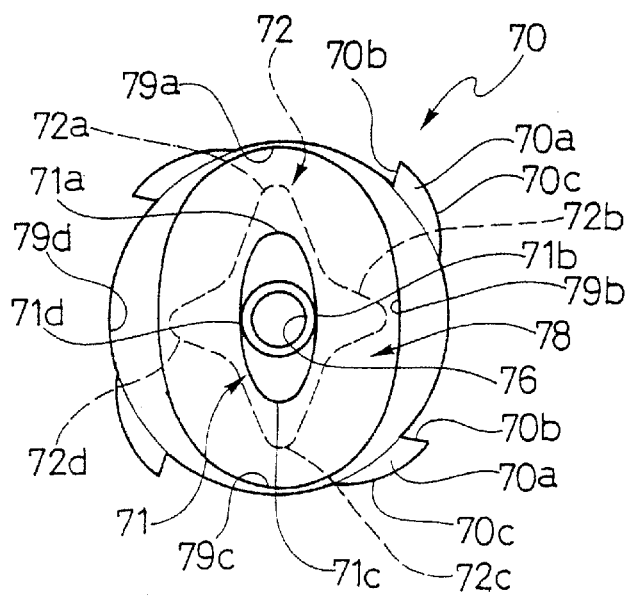
FIG. 32 is a rear elevational view of the positioning ratchet illustrated in FIGS. 30 and 31.
Figure 33:
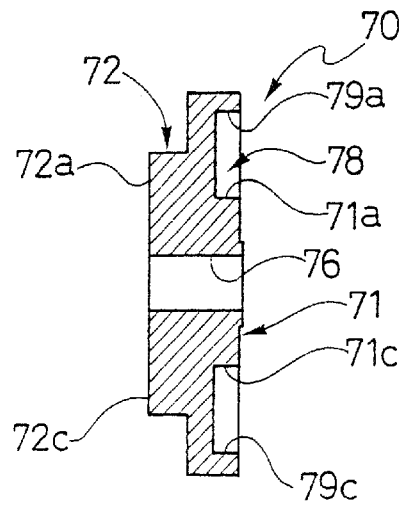
FIG. 33 is a cross-sectional view of the positioning ratchet illustrated in FIGS. 30–32 as seen along section line 33—33 of FIG. 30.
Figure 34:
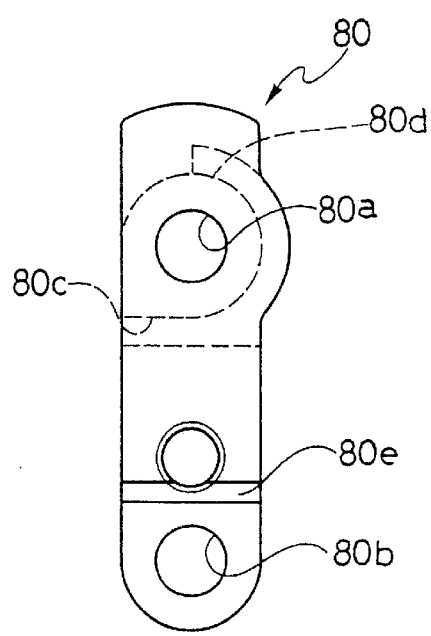
FIG. 34 is an enlarged front elevational view of the actuating member of the chain guide positioning mechanism of the front derailleur illustrated in FIGS. 1–15.
Figure 35:
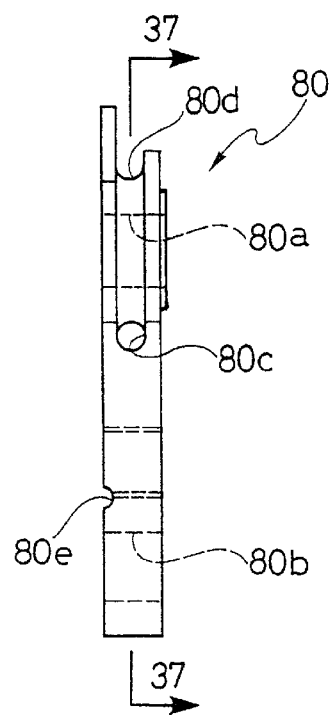
FIG. 35 is a right side elevational view of the actuating member illustrated in FIG. 34.
Figure 36:
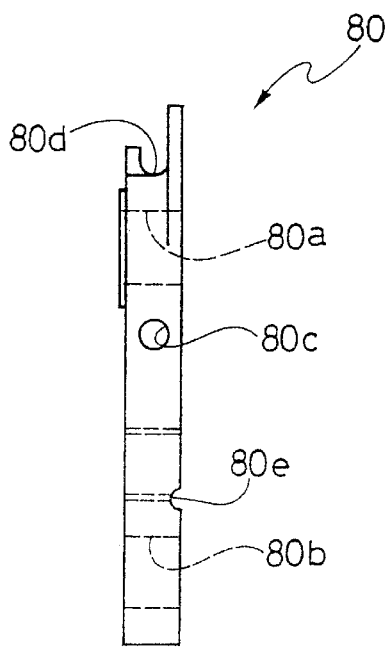
FIG. 36 is a left side elevational view of the actuating member illustrated in FIGS. 34 and 35.
Figure 37:
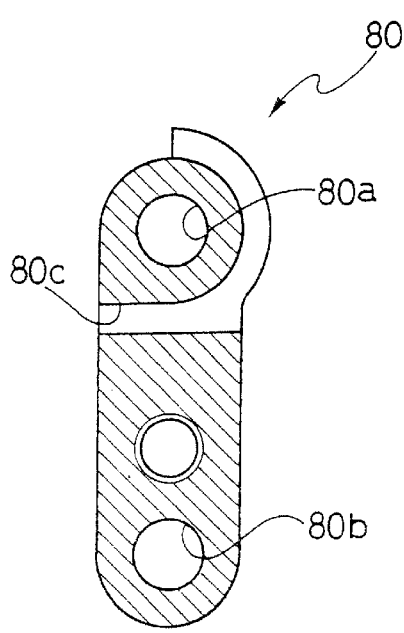
FIG. 37 is a cross-sectional view of the actuating member illustrated in FIGS. 34–36, as seen along section line 37—37 of FIG. 35.

Referring to FIGS. 4 and 29, the cam follower 75 basically includes a cam follower axle 95 and a cam follower roller 96 that is rotatably mounted on the cam follower axle 95. The cam follower axle 95 is fixedly secured to the inner link 44 such that the cam follower roller 96 is located within the actuating groove 78 formed in the positioning ratchet 70. Specifically, cam follower axle 95 is secured in hole 44c of inner link 44. As the positioning ratchet 70 is rotated, the peripheral surface of the actuating cam 71 or the outer peripheral surface of the actuating groove 78 engage the cam follower roller 96 to rotate the inner link 44 about the secondary axle 62. This movement of the inner link 44 causes the chain guide 42 to move between its first and second positions. Of course, the cam follower roller 96 could be eliminated if needed and/or desired. In such an arrangement, cam follower 75 should be designed to slide freely in actuating groove 78.

Referring again to FIGS. 5–15, in a gear shifting operation, the shifting lever 32 is pushed or squeezed to pull the control cable 18 upwards as viewed in FIGS. 7–8 and 12–13, and when the shifting lever 32 is released, the control cable 18 is also released as in FIGS. 10 and 15. This release of the control cable 18 is obtained by the biasing force of the actuating return spring 85 that biases the actuating arm 80 in a clockwise direction. Therefore, while the shifting lever 32 is released, the actuating arm 80 will return to its original position. Hence it is the cable 18 pull that moves the positioning ratchet 70 from the low position to the top position, or from the top position to the low position. Each shift requires the control cable 18 to be pulled and released to perform a gear shifting operation.

Figure 6:
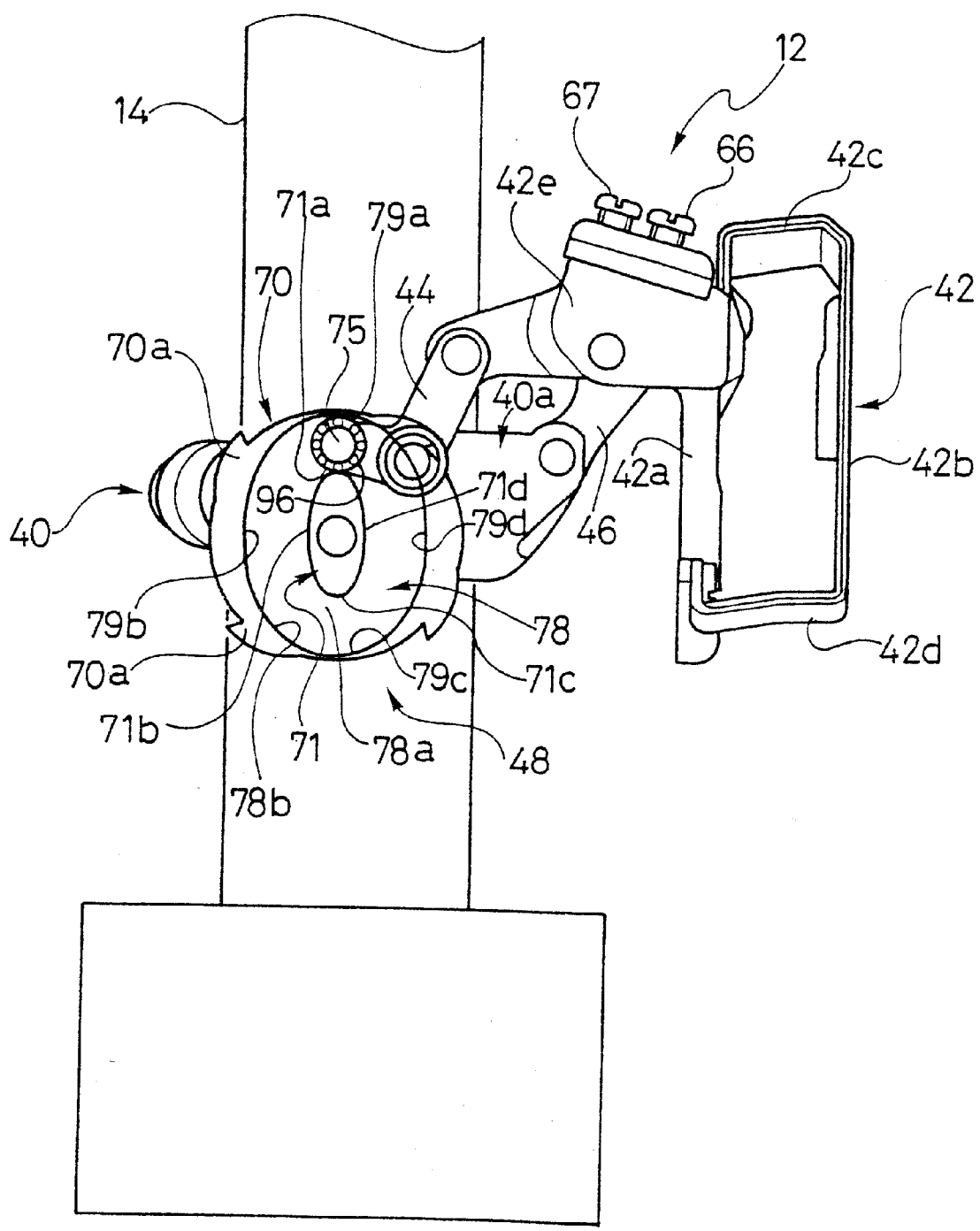
FIG. 6 is a schematic elevational view of the front derailleur illustrated in FIG. 5 with portions of the chain guide positioning mechanism broken away to show the positions of the actuating cam and cam follower when the derailleur is in the top position.
Figure 9:
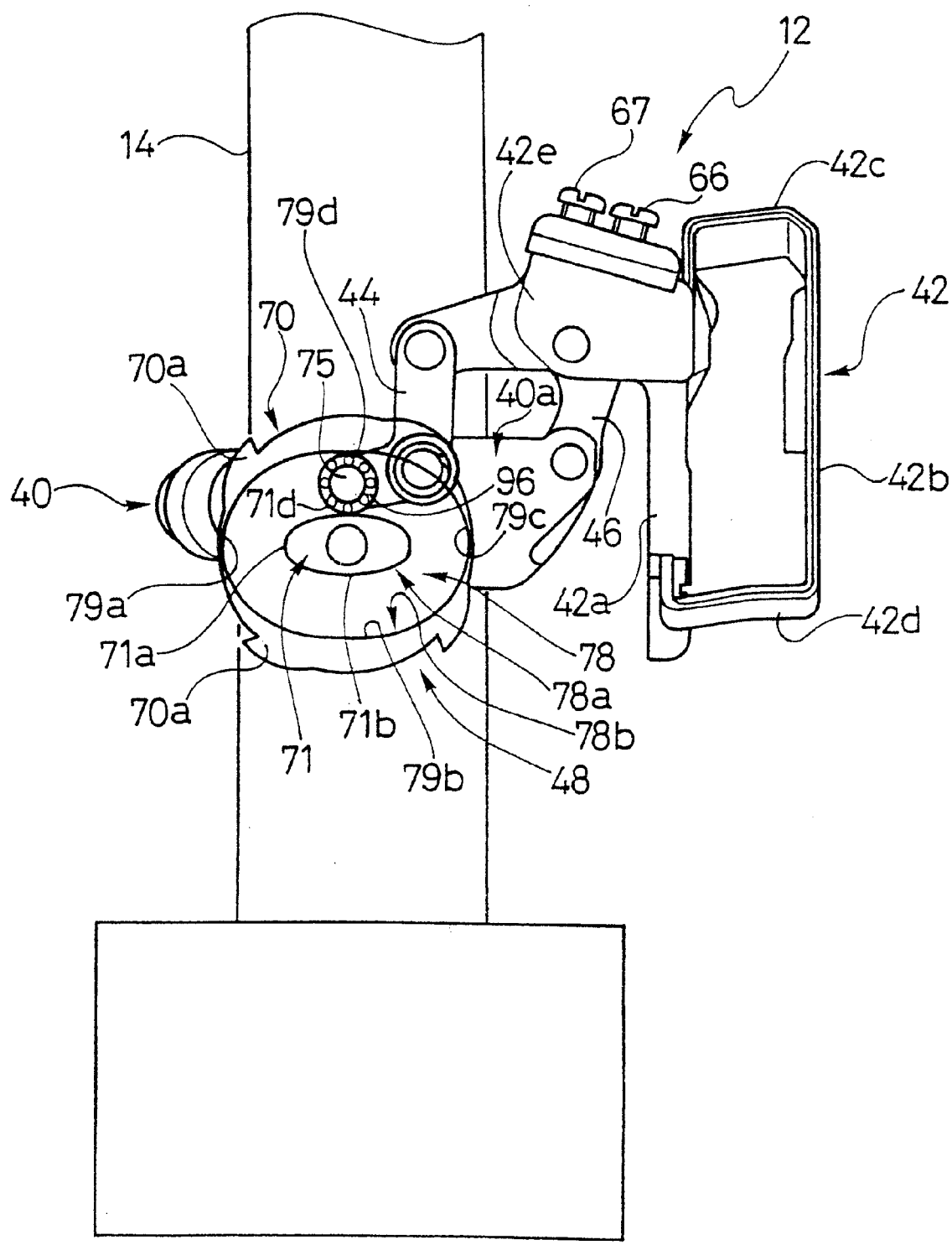
FIG. 9 is a schematic elevational view of the front derailleur illustrated in FIGS. 8 with portions of the chain guide positioning mechanism broken away to show the positions of the actuating cam and cam follower when the derailleur is in the low position.
Figure 14:
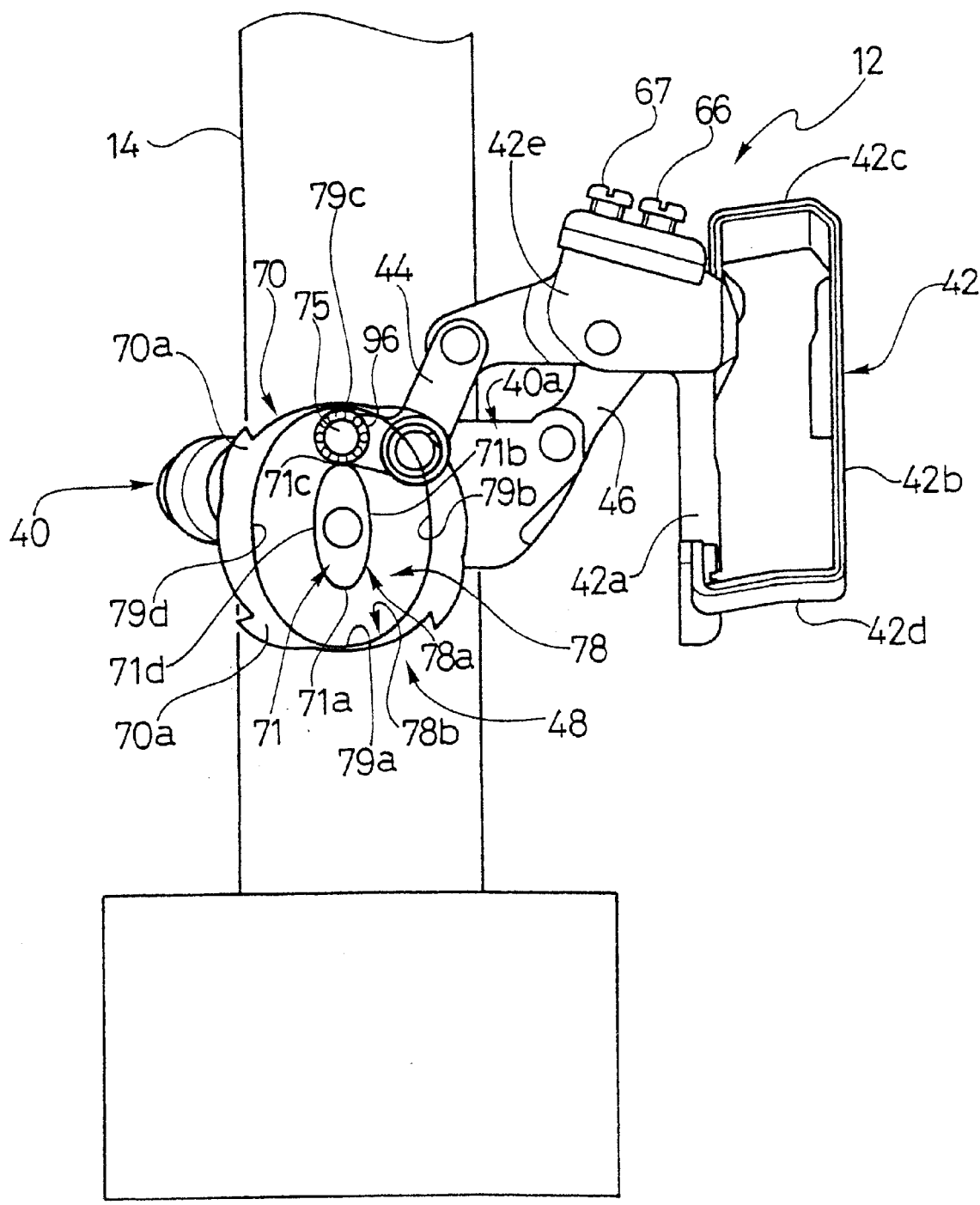
FIG. 14 is a schematic elevational view of the front derailleur illustrated in FIG. 13 with portions of the chain guide positioning mechanism broken away to show the positions of the actuating cam and cam follower when the derailleur is returned to the top position.

The actuating groove 78 has two side walls, the inner wall 78a and the outer wall 78b, as discussed above. The cam follower roller 96 is resting on one of the inner flat surfaces 71a or 71c of the inner wall 78a when the derailleur 12 is in the top position (FIG. 6). When the actuating cam 71 starts to rotate in a counterclockwise direction, the cam follower roller 96 will slowly move away from the inner wall 78a and start to contact the outer wall 78b. The outer wall 78b will then push the cam follower roller 96 downwards to move the chain guide 42. Thus, the derailleur 12 will move from a top position to a low position. At the low position, the cam follower roller 96 is resting on one of the flat positioning surfaces 79b or 79d of the outer wall 78b of the actuating groove 78 (FIG. 9). Again, when the actuating cam 71 starts to rotate, the cam follower roller 96 will slowly move away from the outer flat positioning surface 79b or 79d and contact the inner wall 78a of the actuating groove 78. The inner wall 78a of the actuating groove 78 will push the cam follower roller 96 upwards to move the chain guide 42. Thus, the derailleur 12 will move from a low position back to a top position (FIG. 14).

Figure 7:
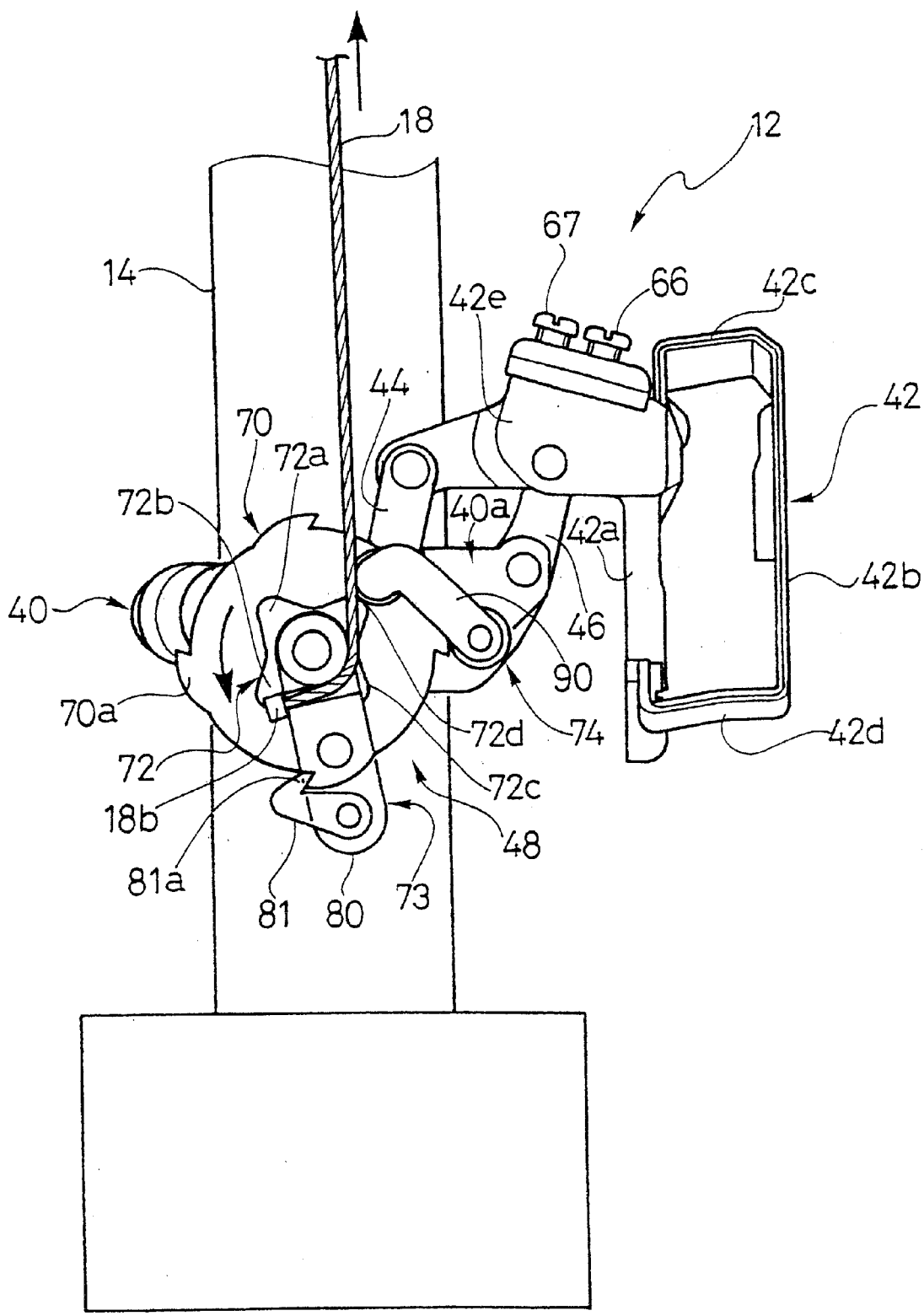
FIG. 7 is a schematic elevational view of the front derailleur illustrated in FIGS. 5–6 showing an intermediate position of the front derailleur and chain guide positioning mechanism when a control cable is pulled to shift the derailleur from the top position to a low position.
Figure 8:
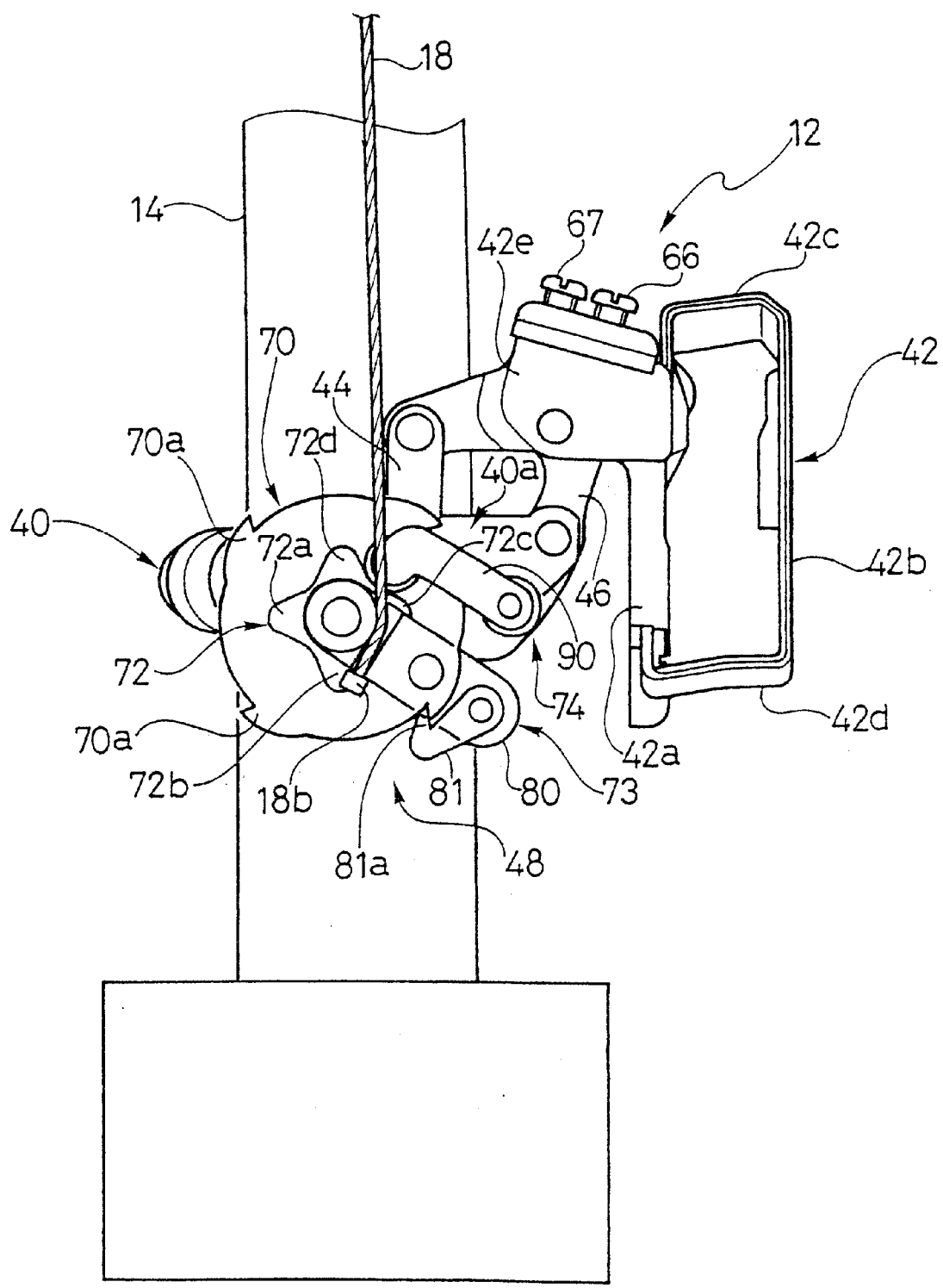
FIG. 8 is a schematic elevational view of the front derailleur illustrated in FIGS. 5–7 showing the chain guide positioning mechanism in a fully actuated position after the derailleur is shifted from the top position into the low position.
Figure 10:
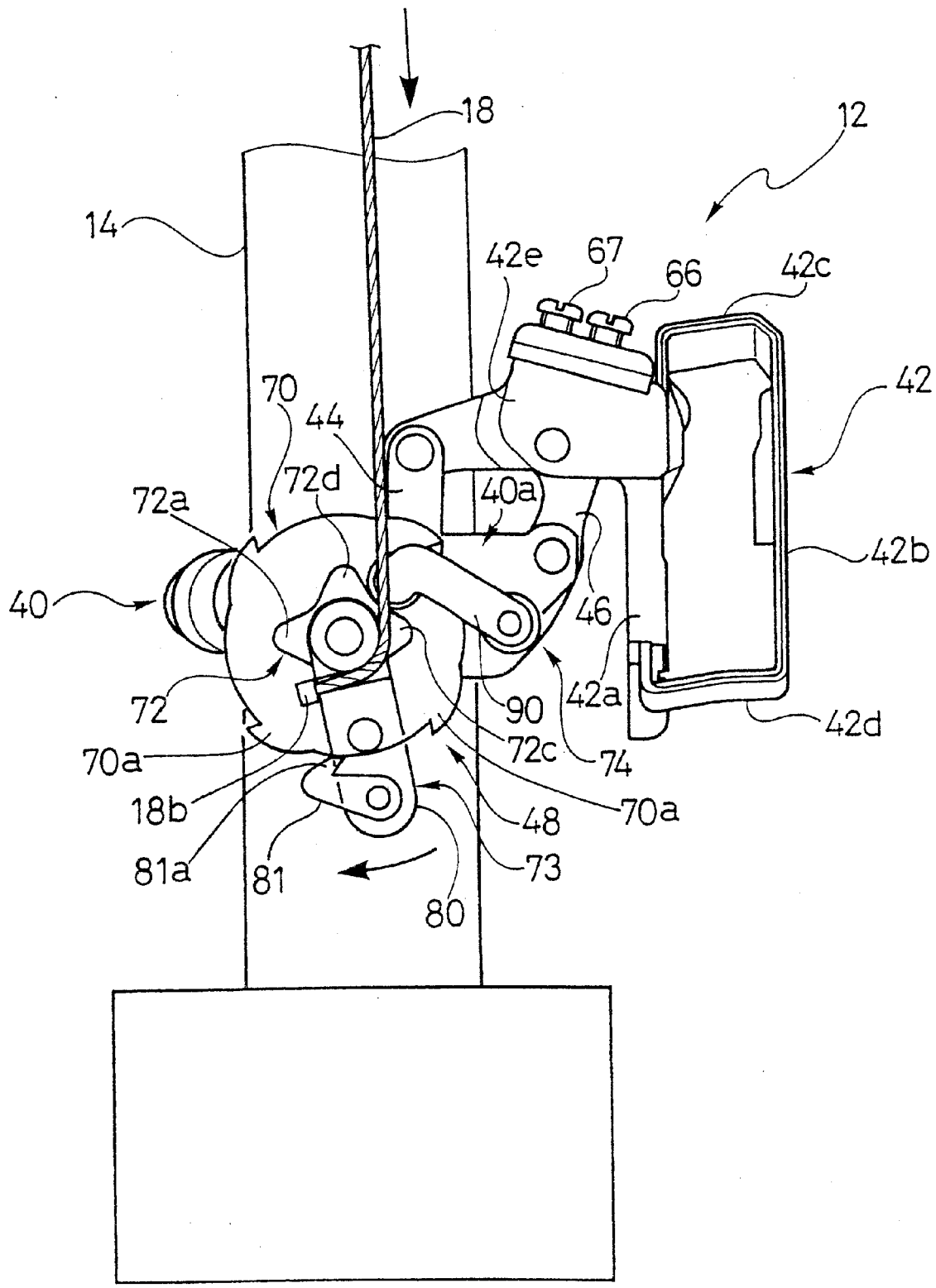
FIG. 10 is a schematic elevational view of the front derailleur illustrated in FIGS. 5–9 showing the actuating member in an intermediate position during release of the control cable after shifting the derailleur from the top position into the low position.
Figure 11:
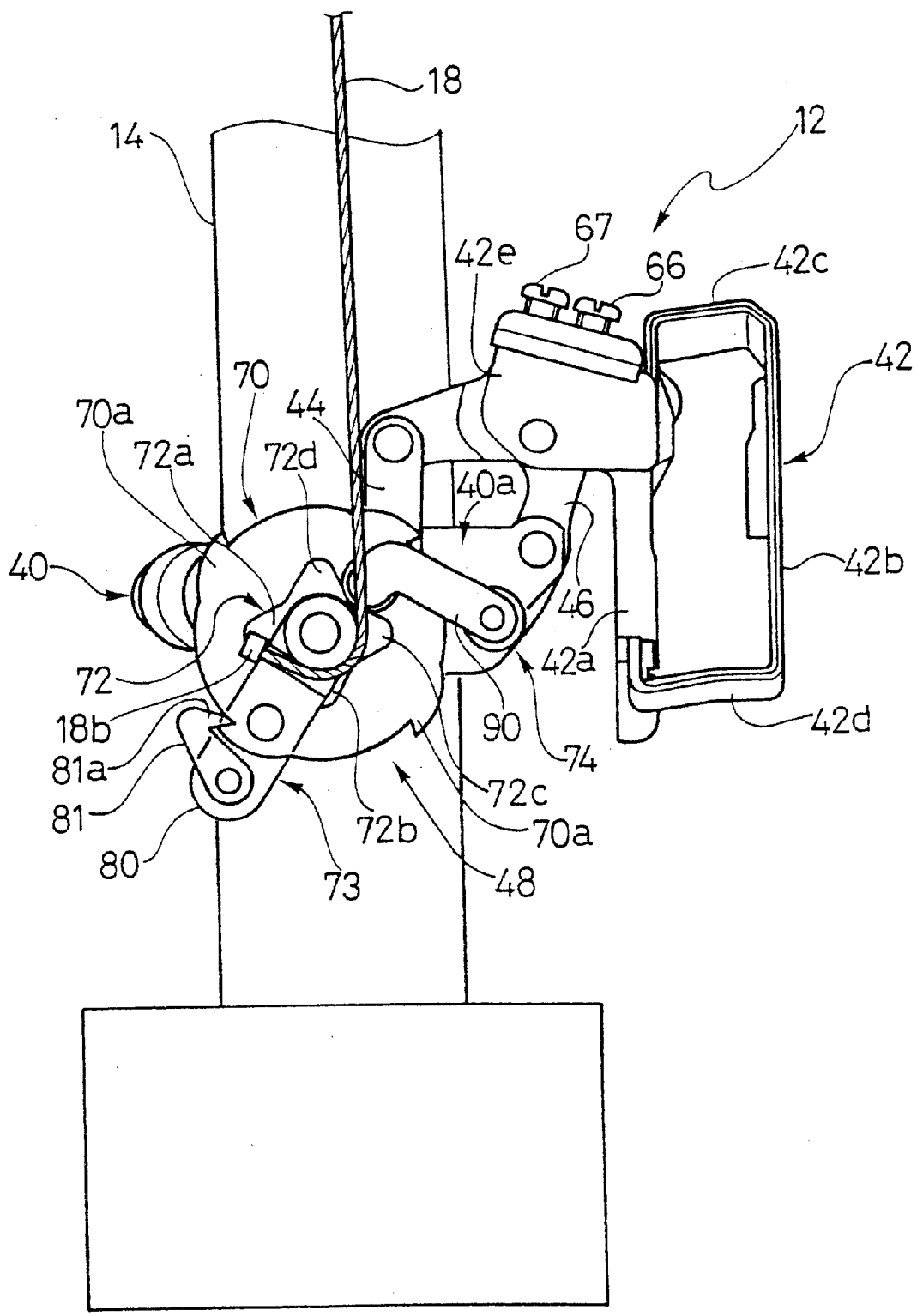
FIG. 11 is a schematic elevational view of the front derailleur illustrated in FIGS. 5–10, showing the actuating member completely returned to the release or rest position after the derailleur is shifted from the top position into the low position.
Figure 12:
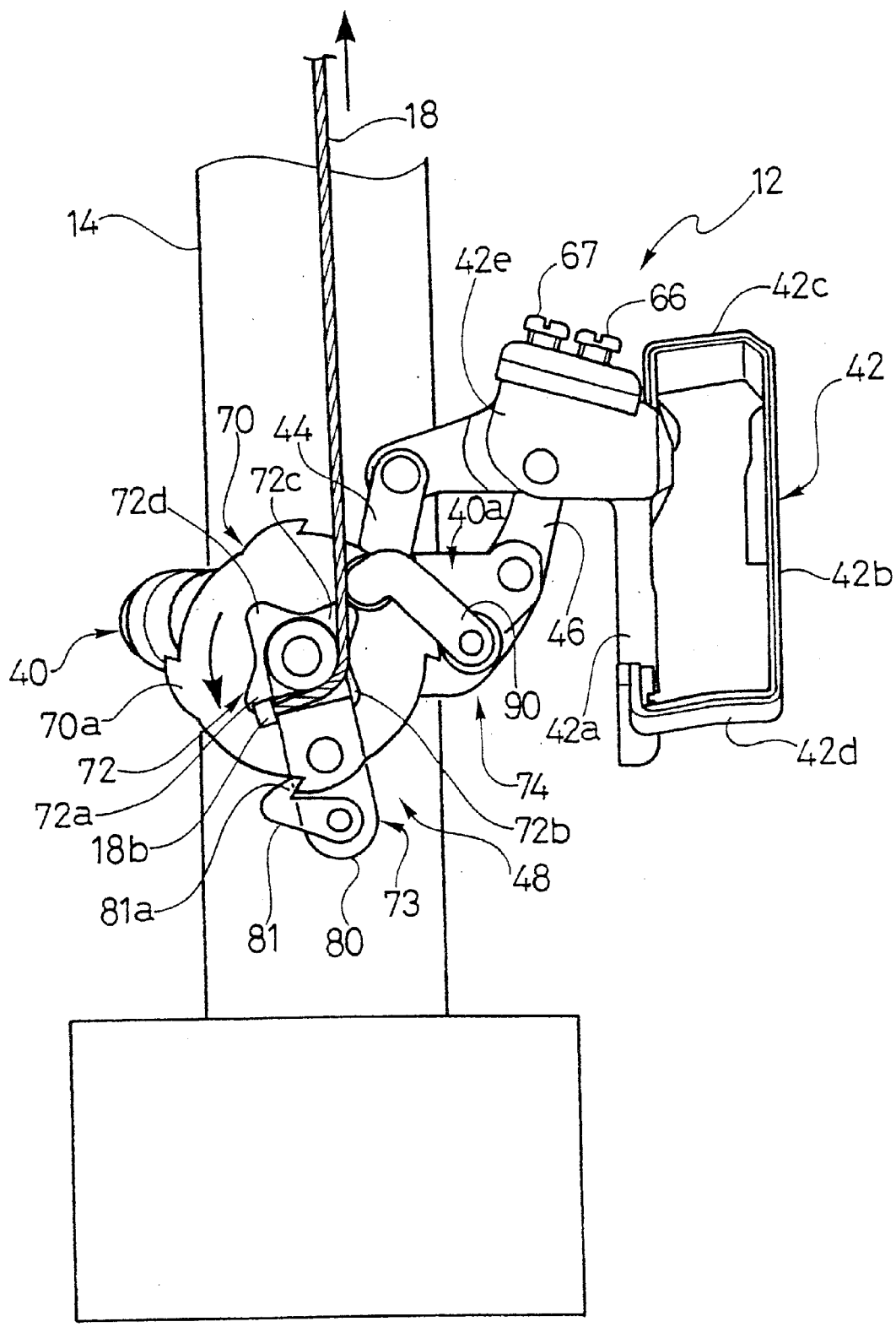
FIG. 12 is a schematic elevational view of the front derailleur illustrated in FIGS. 5–11 showing an intermediate position of the front derailleur and chain guide positioning mechanism when a control cable is pulled to shift the derailleur from the low position to the top position.
Figure 13:
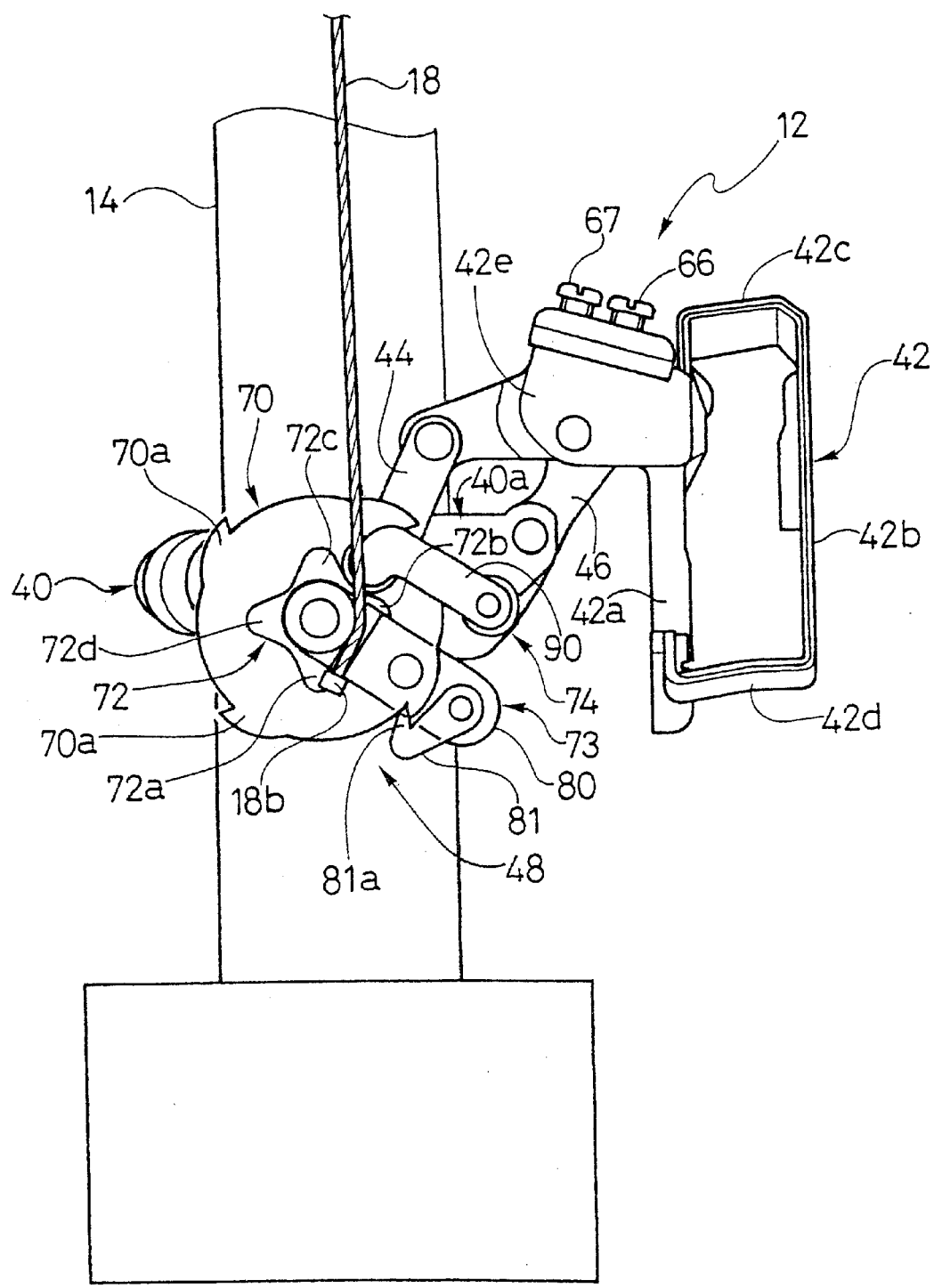
FIG. 13 is a schematic elevational view of the front derailleur illustrated in FIGS. 5–12 showing the chain guide positioning mechanism in a fully actuated position after the derailleur is shifted from the low position into the top position.
Figure 15:
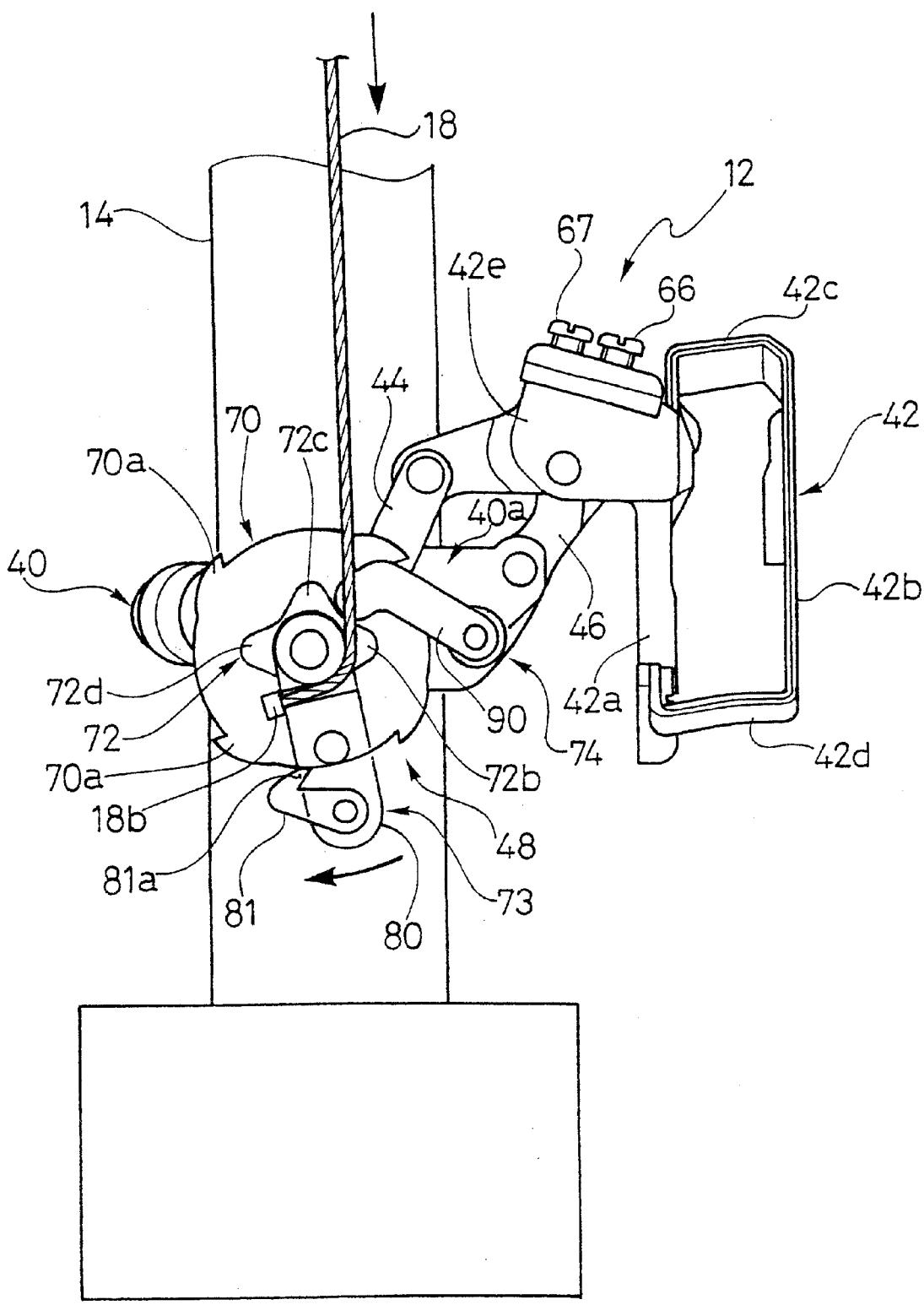
FIG. 15 is a schematic elevational view of the front derailleur illustrated in FIGS. 5–14 showing the actuating member in an intermediate position during release of the control cable after shifting the derailleur from the low position into the top position.

When the shifting lever 32 is pushed or squeezed to pull the control cable 18 upwards, the actuating arm 80 will rotate in a counter clockwise direction (FIGS. 7 and 12). This counter clockwise movement will cause the tooth 81a of the pawl 81 to engage one of the teeth 70a of the positioning ratchet 70 so that the positioning ratchet 70 rotates with the actuating arm 80. Of course, rotation of the positioning ratchet 70 also causes the actuating cam 71 and the indexing cam 72 to rotate therewith. The rotation of the actuating cam 71 causes the cam follower roller 96 to move within the actuating groove 78, which in turn causes the inner link 44 to pivot about its pivot axle 62. The movement of the inner link 44 thus causes the chain guide 42 to move in a direction transverse to the bicycle 10. Also, during the movement of the positioning ratchet 70 and the actuating cam 71, the indexing cam 72 is also rotated which causes the indexing arm 90 to rotate about the indexing axle 63. When the shifting lever 32 is released, the actuating return spring 85 causes the actuating arm 80 to rotate in a clockwise direction (FIGS. 10 and 15). This movement of the actuating arm 80 in the clockwise direction does not cause the positioning ratchet 70, the actuating cam 71 or the indexing cam 72 to rotate. More specifically, the pawl 81 can freely ride over the peripheral surface of the positioning ratchet 70 due to the ramping surfaces 70c of the teeth 70a of the positioning ratchet 70. Moreover, rotation of the positioning ratchet 70 and the actuating cam 71 is prevented by the indexing arm 90 that engages the indexing cam 72.

In the preferred embodiment only two shift positions are illustrated (i.e. a top position and a low position. Of course, it will be apparent to those skilled in the art from this disclosure that the actuating cam 71 and indexing cam 72 could be modified to provide more than two shifting positions. For example, the derailleur could be modified so as to have three or more shifting positions as needed and/or desired. In such an arrangement with three shifting positions, the shifter 16 would be configured to pull cable 18 an amount corresponding to sixty degrees of rotation of the positioning ratchet 70. The cam 71 would be provided with six flat surfaces, with three oppositely facing pairs of surfaces spaced 60 degrees from each other in the rotational direction Moreover, in such an arrangement, the positioning ratchet would have six teeth 70a spaced sixty degrees from each other, and the indexing cam 71 would have six protrusions also spaced 60 degrees from each other with recesses arranged therebetween for receiving the indexing arm. Alternatively, actuating cam 71 could be configured to have only three flat surfaces corresponding to the three shifting positions. In any case, the positioning ratchet 70, the actuating cam 71, groove 78, indexing cam 72, indexing mechanism 73, control cable 18 and shifting unit 16 should be configured to cooperate to move the chain guide 42 into the desired shifting positions.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle derailleur comprising:
   a mounting member that is adapted to be coupled to a portion of the bicycle;
   a chain guide movably coupled to said mounting member, said chain guide being adapted to shift a chain of a bicycle in a transverse direction; and
   a chain guide positioning mechanism including an actuating cam operatively coupled to said chain guide, said actuating cam being adapted to be coupled to a control element and arranged and configured to rotate only in one direction in response to movement of the control element to move said chain guide from a first position to a second position, said actuating cam further being arranged and configured to rotate only in said one direction in response to movement of the control element to move said chain guide from said second position to said first position, said actuating cam further being arranged and configured to at least initially move in said one direction independently of rotational movement of the chain that is being shifted by said chain guide and independently of rotational movement of a front sprocket that is coupled to the chain.

2. A bicycle derailleur according to claim 1, wherein said chain guide is movably coupled to said mounting member by a linkage assembly, which is moved by rotation of said actuating cam.

3. A bicycle derailleur according to claim 1, wherein said chain guide positioning mechanism includes a one-way clutch mechanism coupled to said actuating cam.

4. A bicycle derailleur according to claim 3, wherein said one-way clutch mechanism includes a ratchet fixedly coupled to said actuating cam and an actuating element with a pawl engaging said ratchet, said actuating element having a control element attachment structure that is adapted to be coupled to the control element.

5. A bicycle derailleur comprising:
   a mounting member that is adapted to be coupled to a portion of the bicycle;
   a chain guide movably coupled to said mounting member, said chain guide being adapted to shift a chain of a bicycle in a transverse direction; and
   a chain guide positioning mechanism including an actuating cam operatively coupled to said chain guide, said chain guide being movably coupled to said mounting member by a linkage assembly, which is moved by rotation of said actuating cam, said linkage assembly including a pair of links pivotally coupled at first ends to said mounting member and pivotally coupled at second ends to said chain guide, said actuating cam being adapted to be coupled to a control element and arranged and configured to rotate only in one direction in response to movement of the control element to move said chain guide from a first position to a second position, said actuating cam further being arranged and configured to rotate only in said one direction in response to movement of the control element to move said chain guide from said second position to said first position, said actuating cam moves in said one direction independently of all movement of the chain that is being shifted by said chain guide.

6. A bicycle derailleur, comprising:

a mounting member that is adapted to be coupled to a portion of the bicycle;

a chain guide movably coupled to said mounting member, said chain guide being adapted to shift a chain of a bicycle in a transverse direction; and a chain guide positioning mechanism including an actuating cam operatively coupled to said chain guide, said actuating cam being adapted to be coupled to a control element and arranged to rotate only in one direction in response to movement of the control element to move said chain guide from a first position to a second position, said chain guide being movably coupled to said mounting member by a linkage assembly, which is moved by rotation of said actuating cam, said linkage assembly including a pair of links pivotally coupled at first ends to said mounting member and pivotally coupled at second ends to said chain guide, said actuating cam contacting one of said links to cause pivotal movement thereof.

7. A bicycle derailleur comprising:

a mounting member that is adapted to be coupled to a portion of the bicycle;

a chain guide movably coupled to said mounting member, said chain guide being adapted to shift a chain of a bicycle in a transverse direction; and a chain guide positioning mechanism including an actuating cam operatively coupled to said chain guide, said actuating cam being adapted to be coupled to a control element and arranged and configured to rotate only in one direction in response to movement of the control element to move said chain guide from a first position to a second position, said actuating cam further being arranged and configured to rotate only in said one direction in response to movement of the control element to move said chain guide from said second position to said first position, said actuating cam moves in said one direction independently of all movement of the chain that is being shifted by said chain guide, said chain guide positioning mechanism further including a one-way clutch mechanism coupled to said actuating cam, said one-way clutch mechanism including a ratchet fixedly coupled to said actuating cam and an actuating element with a pawl engaging said ratchet, said actuating element having a control element attachment structure that is adapted to be coupled to the control element, said actuating element being pivotally coupled on a first axle.

8. A bicycle derailleur according to claim 7, wherein said ratchet and said actuating cam are pivotally coupled on said first axle.

9. A bicycle derailleur comprising:

a mounting member that is adapted to be coupled to a portion of the bicycle;

a chain guide movably coupled to said mounting member, said chain guide being adapted to shift a chain of a bicycle in a transverse direction; and a chain guide positioning mechanism including an actuating cam operatively coupled to said chain guide, said actuating cam being adapted to be coupled to a control element and arranged and configured to rotate only in one direction in response to movement of the control element to move said chain guide from a first position to a second position, said actuating cam further being arranged and configured to rotate only in said one direction in response to movement of the control element to move said chain guide from said second position to said first position, said actuating cam moves in said one direction independently of all movement of the chain that is being shifted by said chain guide, said chain guide positioning mechanism further including an indexing mechanism with an indexing element that is arranged to operatively apply a retaining force to said actuating cam.

10. A bicycle derailleur according to claim 9, wherein said indexing mechanism further includes an indexing cam that is fixedly coupled to said actuating cam to rotate therewith and said indexing element contacts said indexing cam to apply said retaining force to said actuating cam.

11. A bicycle derailleur according to claim 10, wherein said indexing element is pivotally mounted to said mounting member and biased against said indexing cam to apply said retaining force thereto.

12. A bicycle derailleur, comprising:

a mounting member that is adapted to be coupled to a portion of the bicycle;

a chain guide movably coupled to said mounting member, said chain guide being adapted to shift a chain of a bicycle in a transverse direction; and a chain guide positioning mechanism including an actuating cam operatively coupled to said chain guide, said actuating cam being adapted to be coupled to a control element and arranged to rotate only in one direction in response to movement of the control element to move said chain guide from a first position to a second position, said chain guide being movably coupled to said mounting member by a linkage assembly, which is moved by rotation of said actuating cam, said actuating cam including an annular actuating groove with a cam follower located therein, said cam follower being coupled to said linkage assembly, said actuating groove being oval shaped with two points corresponding to said first position and two points corresponding to said second position such that one rotation of said actuating cam causes said chain guide to reciprocate twice between said first and second positions.

13. A bicycle derailleur comprising:

a mounting member that is adapted to be coupled to a portion of the bicycle;

a chain guide movably coupled to said mounting member, said chain guide being adapted to shift a chain of a bicycle in a transverse direction; and a chain guide positioning mechanism including an actuating cam operatively coupled to said chain guide, said chain guide being movably coupled to said mounting member by a linkage assembly, which is moved by rotation of said actuating cam, said actuating cam including an annular actuating groove with a cam follower located therein, said cam follower being coupled to said linkage assembly, said actuating cam being adapted to be coupled to a control element and arranged and configured to rotate only in one direction in response to movement of the control element to move said chain guide from a first position to a second position, said actuating cam further being arranged and configured to rotate only in said one direction in response to movement of the control element to move said chain guide from said second position to said first position, said actuating cam moves in said one direction independently of all movement of the chain that is being shifted by said chain guide.

14. A bicycle derailleur according to claim 13, wherein said chain guide positioning mechanism includes a one-way clutch mechanism coupled to said actuating cam.

15. A bicycle derailleur according to claim 14, wherein said chain guide positioning mechanism includes an indexing mechanism with an indexing element that is arranged to operatively apply a retaining force to said actuating cam.

16. A bicycle derailleur according to claim 15, wherein said one-way clutch mechanism includes a ratchet fixedly coupled to said actuating cam and an actuating element with a pawl engaging said ratchet, said actuating element having a control element attachment structure that is adapted to be coupled to the control element.

17. A bicycle derailleur according to claim 16, wherein said actuating element is pivotally coupled on a first axle.

18. A bicycle derailleur according to claim 17, wherein said ratchet and said actuating cam are pivotally coupled on said first axle.

19. A bicycle derailleur according to claim 18, wherein said indexing mechanism further includes an indexing cam that is fixedly coupled to said actuating cam to rotate therewith and said indexing element contacts said indexing cam to apply said retaining force to said actuating cam.

20. A bicycle derailleur according to claim 19, wherein said indexing element is pivotally mounted to said mounting member and biased against said indexing cam to apply said retaining force thereto.

21. A bicycle derailleur comprising:

a mounting member that is adapted to be coupled to a portion of the bicycle;

a chain guide movably coupled to said mounting member, said chain guide being adapted to shift a chain of a bicycle in a transverse direction, said chain guide being arranged above said mounting member; and a chain guide positioning mechanism including an actuating cam operatively coupled to said chain guide, said actuating cam being adapted to be coupled to a control element and arranged and configured to rotate only in one direction in response to movement of the control element to move said chain guide from a first position to a second position, said actuating cam further being arranged and configured to rotate only in said one direction in response to movement of the control element to move said chain guide from said second position to said first position, said actuating cam further being arranged and configured to at least initially move in said one direction independently of rotational movement of a front sprocket that is coupled to the chain.

* * * * *